United States Patent
Satoda

(10) Patent No.: US 9,973,402 B2
(45) Date of Patent: May 15, 2018

(54) TRANSMISSION DEVICE, RECEIVING DEVICE, AND RELAY DEVICE

(71) Applicant: NEC Corporation, Minato-ku, Tokyo (JP)

(72) Inventor: Kozo Satoda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 223 days.

(21) Appl. No.: 14/900,367

(22) PCT Filed: Apr. 30, 2014

(86) PCT No.: PCT/JP2014/002378
§ 371 (c)(1),
(2) Date: Dec. 21, 2015

(87) PCT Pub. No.: WO2014/207978
PCT Pub. Date: Dec. 31, 2014

(65) Prior Publication Data
US 2016/0164759 A1    Jun. 9, 2016

(30) Foreign Application Priority Data
Jun. 26, 2013   (JP) ................................. 2013-134095

(51) Int. Cl.
*H04L 12/26* (2006.01)
*H04L 25/20* (2006.01)
(Continued)

(52) U.S. Cl.
CPC .......... *H04L 43/08* (2013.01); *H04L 12/6418* (2013.01); *H04L 25/20* (2013.01);
(Continued)

(58) Field of Classification Search
CPC ..... H04L 12/6418; H04L 25/20; H04L 43/08; H04L 43/10; H04L 43/16; H04L 43/0829;
(Continued)

(56) References Cited

U.S. PATENT DOCUMENTS 5,675,583 A * 10/1997 Bales .................. H04L 12/1822
370/261
6,247,058 B1 * 6/2001 Miller ..................... H04L 47/10
370/418
(Continued)

FOREIGN PATENT DOCUMENTS

JP   H08-305643 A    11/1996
JP   H11-242640 A    9/1999
(Continued)

OTHER PUBLICATIONS

Vinay J. Ribeiro, Rudolf H. Riedi, Richard G. Baraniuk, Jiri Navratil, and Les Cottrell, "pathChirp: Efficient Available Bandwidth Estimation for Network Paths", Passive and Active Monitoring Workshop, Apr. 6, 2003-Apr. 8, 2003, San Diego, CA.
(Continued)

*Primary Examiner* — Ruolei Zong

(57) ABSTRACT

Provided are a transmission device, a receiving device, and a relay device, whereby it is possible to achieve low latency voice communication, and to prevent deterioration in voice data. The transmission device comprises: a data distribution means (1) for distributing segmented data to one or a plurality of TCP connections; a network state monitoring means (2) for monitoring a state of a communications network; and a transmission method determination means (3) for changing a data segmenting method and a method of transmitting the segmented data according to the state of the communication network which is a result of the monitoring of the network state monitoring means (2).

9 Claims, 14 Drawing Sheets

(51) Int. Cl.
  *H04L 29/06* (2006.01)
  *H04L 12/64* (2006.01)
(52) U.S. Cl.
  CPC ............ *H04L 65/605* (2013.01); *H04L 65/80* (2013.01); *H04L 69/14* (2013.01); *H04L 69/16* (2013.01); H04L 43/0829 (2013.01); H04L 43/10 (2013.01)
(58) Field of Classification Search
  CPC ....... H04L 47/25; H04L 65/80; H04L 65/605; H04L 67/28; H04L 69/14; H04L 69/16
  USPC ....................................................... 709/224
  See application file for complete search history.

(56) References Cited

U.S. PATENT DOCUMENTS

| | | | | |
|---|---|---|---|---|
| 6,449,269 | B1* | 9/2002 | Edholm | H04M 1/2535 370/352 |
| 6,460,087 | B1 | 10/2002 | Saito et al. | |
| 6,701,373 | B1* | 3/2004 | Sakazawa | H04L 67/06 709/232 |
| 7,617,337 | B1* | 11/2009 | Beck | H04L 65/80 370/229 |
| 2004/0073641 | A1* | 4/2004 | Minhazuddin | H04L 29/06 709/223 |
| 2005/0005207 | A1* | 1/2005 | Herneque | H04L 47/10 714/712 |
| 2006/0098667 | A1* | 5/2006 | Shibata | H04L 12/66 370/401 |
| 2010/0057927 | A1* | 3/2010 | Southwick | G06Q 10/06 709/231 |
| 2011/0093617 | A1* | 4/2011 | Igarashi | H04N 21/23406 709/246 |

FOREIGN PATENT DOCUMENTS

| | | |
|---|---|---|
| JP | 2004-260668 A | 9/2004 |
| JP | 2005-311792 A | 11/2005 |
| JP | 2008-167223 A | 7/2008 |
| JP | 2009-100118 A | 5/2009 |
| JP | 2011-142622 A | 7/2011 |
| JP | 2011-228823 A | 11/2011 |

OTHER PUBLICATIONS

International Search Report for PCT Application No. PCT/JP2014/002378 , dated Jul. 22, 2014.
English translation of Written opinion for PCT Application No. PCT/JP2014/002378.

* cited by examiner

TRANSMISSION DEVICE, RECEIVING DEVICE, AND RELAY DEVICE

This application is a National Stage Entry of PCT/JP2014/002378 filed on Apr. 30, 2014 which claims priority from Japanese Patent Application 2013-134095 filed on Jun. 26, 2013, the contents of all of which are incorporated herein by reference, in their entirety.

TECHNICAL FIELD

The present invention relates to a transmission device, a receiving device, and a relay device that transmit and receive real time media data with low latency and high quality by using TCP (Transmission Control Protocol) connections.

BACKGROUND ART

IP telephones, which transmit and receive voice data by using IP (Internet Protocol) networks, have come into wide use. Along with popularization of the Internet and mobile Internet and speed-up in those communications, IP telephones that use the Internet and mobile Internet, which do not assure quality, have also become popular.

In voice communication, it is important to be able to talk with a person at the other end in real time. However, IP telephones have high voice latency compared with general telephones using a circuit switching system and have low voice communication quality. To provide stable IP telephone communication services, the Ministry of Internal Affairs and Communications has stipulated a service standard for IP telephone service providers. In the service standard, the criterion of end-to-end voice delay time for IP telephones is, for example, less than 400 milliseconds.

In many cases, the above-described quality standard is not applied to IP telephones using the Internet or mobile networks, and voice communication with a voice delay time of less than 400 milliseconds is not achieved. However, to maintain quality for IP telephones using the Internet or mobile networks as well, it is important to achieve voice communication with as low latency as possible.

To transmit voice data to the other end with low latency, many IP telephones transmit voice data by using RTP (Realtime Transport Protocol) on UDP (User Datagram Protocol).

When UDP is used, there is no assurance for data to reach the other end of the line. Instead, data transmission with low latency is achieved. Thus, UDP is used for multimedia communication that requires real time processing. However, data transmission using UDP has a flaw in that packets are unable to go through a NAT (Network Address Translation) or firewall.

NAT is a technology that is used for connecting terminals without global IP addresses to the Internet. Devices in front of a NAT are unable to know the IP addresses of terminals behind the NAT. Thus, the devices in front of the NAT are unable to transmit data to the terminals behind the NAT directly using UDP. Many firewalls are set not to let UDP communications from the outside of networks come into the inside of the networks for protection from communication network attacks from the outside of the networks.

To transmit data using UDP from the outside of a network to devices behind a NAT or firewall, it is required to apply special settings to the NAT or firewall or to use a particular protocol, such as RFC5389 Session Traversal Utilities for NAT (STUN), which is standardized by IETF (Internet Engineering Task Force). However, the above-described methods to deal with the flaw have another flaw in that resistance to communication network attacks weakens, it takes a cost to handle a particular protocol, or the like.

Since, on the Internet or mobile networks, user terminals often reside behind a NAT or firewall, some IP telephone services on the Internet transmit voice data by using TCP, with which transmitted data are able to pass through a NAT or firewall easily.

When TCP is used, since retransmission of lost packets or flow control is performed, data reachability to a terminal at the other end is assured. Instead, low latency data communication is not taken into consideration. Thus, generally, TCP is not used for a service that requires real time property, such as voice communication. IP telephone services using TCP have an advantage in that connectivity is assured but also have a disadvantage in that voice delay is substantial.

Regarding the above-described problem, a technology to carry out data communication with low latency by using TCP is disclosed in PTL 1. A communication device disclosed in PTL 1 achieves data communication with low latency using TCP with a configuration as described below.

A transmission device disclosed in PTL 1 establishes a plurality of TCP connections between a transmission device and a receiving device, segments transmission target data, such as voice data, into a plurality of packets, and distributes and transmits the plurality of packets to different established TCP connections. Thus, even when a loss occurs to a packet distributed to a TCP connection and the packet arrives late, the receiving device is capable of receiving packets that are distributed to (an)other TCP connection(s) without delay.

The communication device disclosed in PTL 1 achieves low latency voice communication by treating a packet(s) that arrive(s) late due to a packet loss(es) as a lost packet(s). Since a portion of the voice data corresponding to the packet(s) treated as a lost packet(s) is not used by the receiving side, voice data reproduced by the receiving device become deteriorated data compared with the data before transmission.

CITATION LIST

Patent Literature

PTL 1: Japanese Unexamined Patent Application Publication No. 2009-100118
PTL 2: Japanese Unexamined Patent Application Publication No. 2011-142622
PTL 3: Japanese Unexamined Patent Application Publication No. 2011-228823

Non Patent Literature

NPL 1: Vinay J. Ribeiro, Rudolf H. Riedi, Richard G. Baraniuk, Jiri Navratil, and Les Cottrell, "pathChirp: Efficient available Bandwidth Estimation for Network Paths," in Proc of Passive and Active Measurement Workshop 2003.

SUMMARY OF INVENTION

Technical Problem

However, the communication device disclosed in PTL 1 does not take into consideration the most appropriate number of TCP connection, a segmenting method to segment voice data into a plurality of packets, and the most appropriate value of allowable delay time for packets arriving to the receiving device. Furthermore, the communication device disclosed in PTL 1 focuses only on achieving low latency voice communication, and does not take into consideration deterioration in voice data.

Accordingly, the present invention has an object to provide a transmission device, a receiving device, and a relay device that achieve low latency voice communication and make it possible to prevent deterioration in voice data.

Solution to Problem

A transmission device according to the present invention includes a data distribution means for distributing segmented data to one or a plurality of TCP connections, a network state monitoring means for monitoring a state of a communication network, and a transmission method determination means for changing a method of segmenting the data and a method of transmission of the segmented data in accordance with the state of the communication network, which is a result of monitoring by the network state monitoring means.

A receiving device according to the present invention includes a data composition means for compositing received segmented data, a network state monitoring means for monitoring a state of a communication network, and a receiving method determination means for changing a method of receiving the segmented data and a method of compositing the segmented data in accordance with the state of the communication network, which is a result of monitoring by the network state monitoring mean.

A relay device according to the present invention includes a data composition means for compositing received segmented data, a network state monitoring means for monitoring a state of a communication network, and a receiving method determination means for changing a method of receiving the segmented data and a method of compositing the segmented data in accordance with the state of the communication network, which is a result of monitoring by the network state monitoring means.

Advantageous Effects of Invention

With the present invention, it is possible to achieve low latency voice communication and prevent deterioration in voice data.

First Exemplary Embodiment

Figure 1:
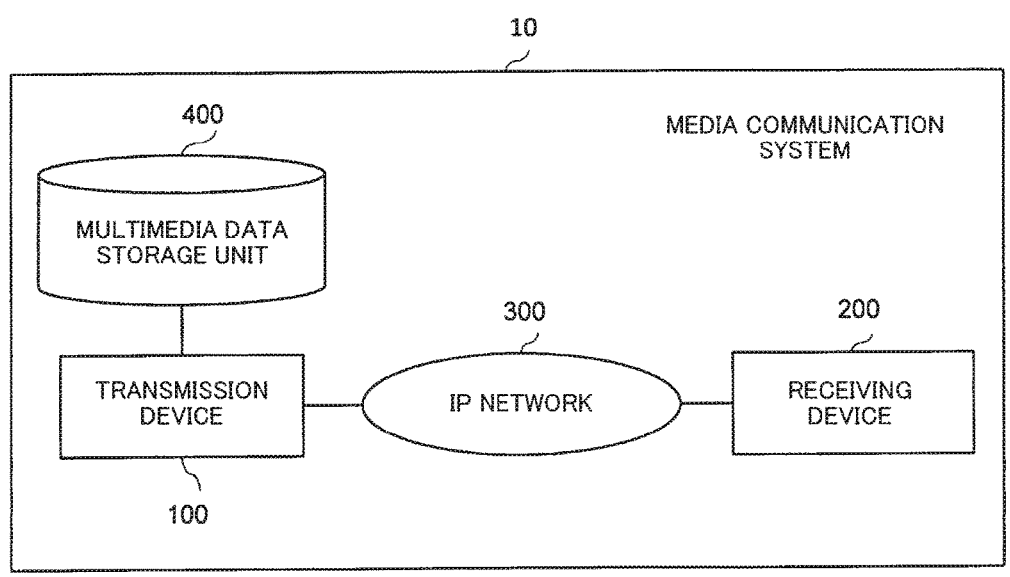
FIG. 1 is a system configuration diagram illustrating a configuration example of a first exemplary embodiment of a media communication system including a transmission device and a receiving device according to the present invention.

Hereinafter, a first exemplary embodiment of the present invention will be described with reference to the accompanying drawings. FIG. 1 is a system configuration diagram illustrating an configuration example of the first exemplary embodiment of a media communication system that includes a transmission device and a receiving device according to the present invention.

A media communication system 10 illustrated in FIG. 1 includes a transmission device 100, a receiving device 200, and a multimedia data storage unit 400. The transmission device 100 is connected to the receiving device 200 in a communicable manner via an IP network 300.

The transmission device 100 transmits multimedia data 500, which are stored in the multimedia data storage unit 400, to the receiving device 200 via the IP network 300.

The multimedia data 500 are multimedia data that are collected from, for example, a microphone (hereinafter, referred to as a mike) or a camera in real time. The multimedia data 500 may also be a multimedia file that has been accumulated in an external storage medium or a storage device that is managed by another device. In the exemplary embodiment, it is assumed that the multimedia data 500 are real time voice data that are input from a mike.

The transmission device 100 is an information processing device that transmits the multimedia data 500 to the receiving device 200 via the IP network 300. The transmission device 100 includes a central processing unit (CPU) (not illustrated) and a storage device (not illustrated), such as a memory and an HDD (Hard Disk Drive). In executing programs stored in the storage device, the transmission device 100 is configured to achieve functions that will be described later. With such a configuration, the transmission device 100 achieves communication of multimedia data.

The receiving device 200 is connected to the transmission device 100 via the IP network 300. The receiving device 200 includes a central processing unit (CPU) (not illustrated) and a storage device (not illustrated), such as a memory and an HDD. In executing programs stored in the storage device, the receiving device 200 is configured to achieve functions that will be described later. With such a configuration, the receiving device 200 achieves reception and reproduction of multimedia data.

The multimedia data 500 that the transmission device 100 transmits may be a multimedia file that has been stored in an external storage medium or a storage device managed by another device. The multimedia data 500 may also be multimedia data that are collected from a mike or a camera in real time.

In the media communication system of the exemplary embodiment, it is supposed that the multimedia data 500 input from the mike in real time are transmitted from the transmission device 100 to the receiving device 200 with as low latency and high quality as possible.

However, the media communication system of the exemplary embodiment is applicable to, in addition to voice data input from a mike, any service as long as the service is a service that transmits multimedia data, such as video data input from a camera in real time, both the video data and the voice data, voice data and video data transmitted not from the camera and the mike but from another device, and multimedia data stored in the storage device.

The IP network 300 is an arbitrary communication network that carries out communication conforming to IP specifications. The IP network 300 includes a relay device or the like (not illustrated), such as a router. The IP network 300 may be achieved with wired communications. A portion or the whole of the IP network 300 may also be achieved with wireless communications.

When the IP network 300 is achieved with wireless communications, a mobile network, such as a third generation mobile network (3G), an HSPA (High Speed Packet Access) network, and an LTE (Long Term Evolution) network, is used for the wireless communications. A wireless LAN (Local Area Network) (for example, Wi-Fi (Registered Trademark)) may also be used for the wireless communications. The transmission device 100 and the receiving device 200 may be interconnected in a communicable manner by any wireless communications on which communication conforming to the IP specifications can be carried out.

Although, in the exemplary embodiment, the transmission device 100 is a device that inputs and transmits a voice and the receiving device 200 is a device that receives and reproduce a voice, the transmission device 100 and the receiving device 200 may not be devices that input or reproduce a voice but devices that only relay voice data.

Figure 2:
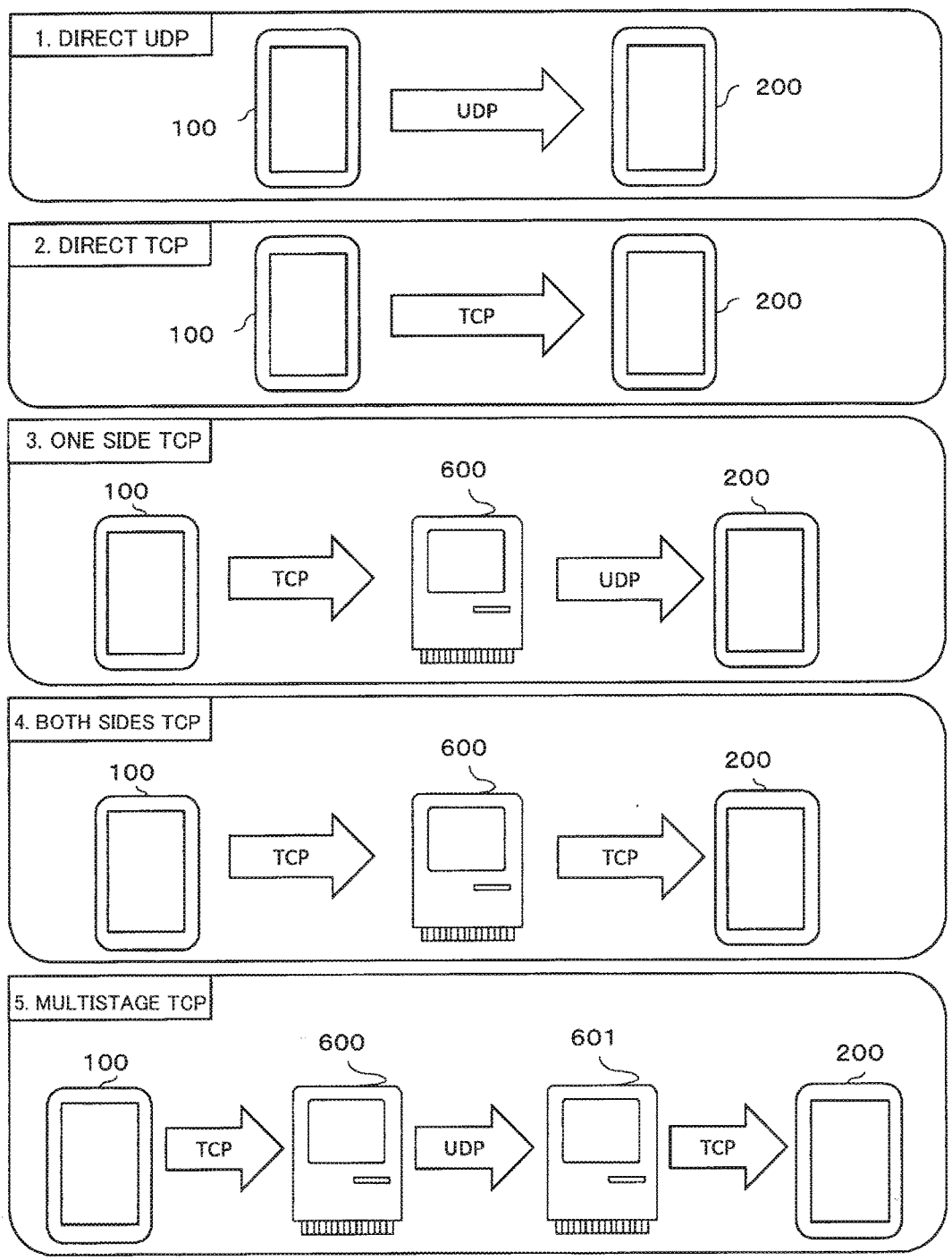
FIG. 2 is an explanatory diagram illustrating examples of modes of communication between the transmission device and the receiving device.

FIG. 2 is an explanatory diagram illustrating examples of modes of communication between the transmission device 100 and the receiving device 200. When UDP communication or TCP communication is carried out directly between the transmission device 100 and the receiving device 200 as shown in drawings labelled '1. direct UDP' and '2. direct TCP' illustrated in FIG. 2, a relay device 600 is unnecessary.

However, when the transmission device 100 or the receiving device 200 resides behind a NAT or a firewall, devices in front of the NAT or firewall are often unable to carry out direct UDP communication. In such a case, a relay device 600 on the way and the transmission device 100 may be interconnected in a communicable manner by a TCP connection, and the relay device 600 and the receiving device 200 may be interconnected in a communicable manner by UDP, as shown in a drawing labelled '3. one side TCP' illustrated in FIG. 2.

As shown in a drawing labelled '4. both sides TCP' illustrated in FIG. 2, a relay device 600 may be placed to relay a TCP connection between the transmission device 100 and the receiving device 200. As shown in a drawing labelled '5. multistage TCP' illustrated in FIG. 2, two or more relay devices may exist between the transmission device 100 and the receiving device 200. The relay device 600 has at least functions of the receiving device 200, which will be described in detail below, and transmits composited data to a receiving device.

Figure 3:
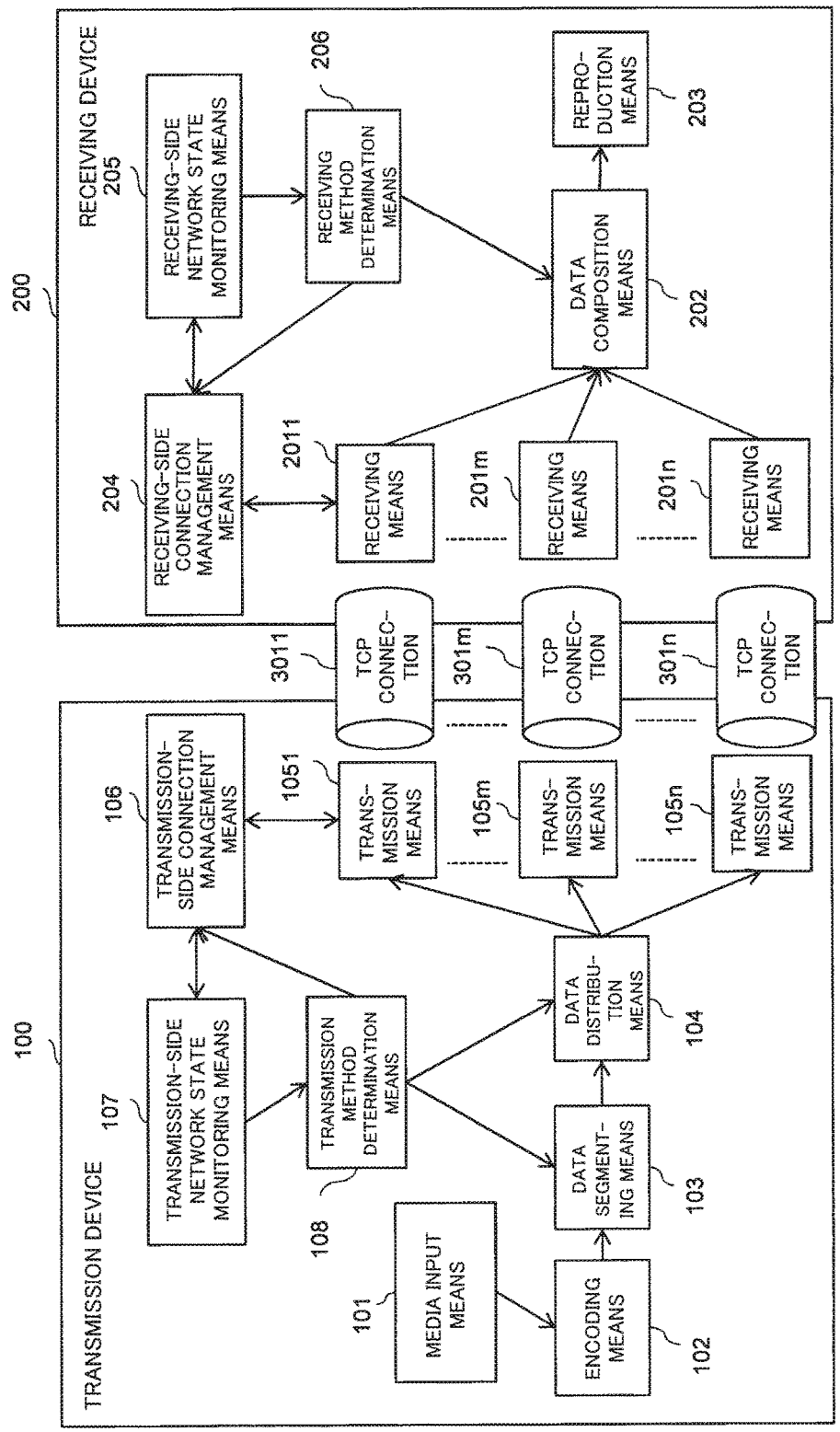
FIG. 3 is a block diagram illustrating an configuration example of the first exemplary embodiment of the transmission device and the receiving device.

Next, detailed configurations of the transmission device 100 and the receiving device 200 will be described with reference to FIG. 3. FIG. 3 is a block diagram illustrating configuration examples of the transmission device 100 and the receiving device 200 of the first exemplary embodiment.

The transmission device 100 illustrated in FIG. 3 includes a media input means 101, an encoding means 102, a data segmenting means 103, a data distribution means 104, transmission means 1051 to 105$n$, a transmission-side connection management means 106, a transmission-side network state monitoring means 107, and a transmission method determination means 108. In the above description, n denotes a natural number.

The receiving device 200 illustrated in FIG. 3 includes receiving means 2011 to 201$n$, a data composition means 202, a reproduction means 203, a receiving-side connection management means 204, a receiving-side network state monitoring means 205, and a receiving method determination means 206.

The transmission means 1051 to 105$n$ of the transmission device 100 are connected to the receiving means 2011 to 201$n$ of the receiving device 200 by TCP connections 3011 to 301$n$, respectively. The number of transmission means of the transmission device 100, the number of receiving means of the receiving device 200, and the number of TCP connections are all identical. In the exemplary embodiment, indices of both groups of means and indices of TCP connections are defined to coincide with one another, for the purpose of illustration. It is assumed that a transmission means 105$m$ is connected to a receiving means 201$m$ by a TCP connection 301$m$ (m=1 to n).

The media input means 101 has a function to input media signals.

The encoding means 102 has a function to encode the media signals input by the media input means 101 by a specific encoding method.

The data segmenting means 103 has a function to segment the media signal encoded by the encoding means 102 into pieces of data of a preset amount.

The data distribution means 104 has a function to distribute the pieces of data, into which the data segmenting means 103 has segmented the media signal, to appropriate transmission means among the transmission means 1051 to 105$n$.

The transmission means 1051 to 105$n$ have a function to transmit the pieces of data, which have been distributed by the data distribution means 104, to the receiving means 2011 to 201$n$ via the TCP connections 3011 to 301$n$.

The transmission-side connection management means 106 has a function to monitor the states of the transmission means 1051 to 105$n$. The transmission-side connection management means 106 conveys the states of the transmission means 1051 to 105$n$ to the transmission-side network state monitoring means 107.

The transmission-side network state monitoring means 107 has a function to estimate or predict a current state or near-future state of the communication network on the basis of the information conveyed from the transmission-side connection management means 106 and information from a means that notifies the state of the communication network.

Primary methods that the transmission-side network state monitoring means 107 uses to estimate the state of the communication network include, for example, a method in which consecutively transmitting and receiving pings using ICMP (Internet Control Message Protocol) packets enables measuring a packet loss rate and packet arrival delays.

For the estimation method or the prediction method of the state of the communication network, a method, which is disclosed in PTL 2, to estimate a currently-available frequency bandwidth by transmitting a plurality of packets consecutively and measuring receiving times of the packets, or a method, which is disclosed in PTL 3, to estimate a packet loss rate by using a probabilistic model may also be used in addition to the above-described method. A method, which is disclosed in NPL 1, that uses pathChirp may also be used.

A type of state of the communication network that the transmission-side network state monitoring means 107 estimates or predicts is, for example, a packet loss rate. The packet loss rate is, for example, predicted by, when the transmission-side network state monitoring means 107 is able to estimate an available bandwidth by the methods described in PTL 2 and NPL 1, or the like, measuring the temporal variation of the available bandwidth, and, when the available bandwidth becomes small, deciding that there is a higher possibility that packet losses are occurring than usual.

The packet loss rate may also be estimated by a method to monitor TCP/IP, which is managed by the connection management means. Specifically, when the amount of a transmission buffer of TCP/IP has increased, the transmission-side connection management means 106 on the transmission side is able to judge that packet losses have been occurring. When data that are expected to be received regularly have not been received, the receiving-side connection management means 204 on the receiving side is able to judge that the packet loss rate has been increasing.

Although, in the above description, the transmission-side network state monitoring means 107 is supposed to estimate or predict the packet loss rate, the packet loss rate, the packet arrival delay, and the available bandwidth are closely related with one another. That is, the transmission-side network state monitoring means 107 is able to make a prediction such that, when the packet arrival delay increases, the packet loss rate rises, or, when the available bandwidth decreases, the packet loss rate rises. Thus, the transmission-side network state monitoring means 107 may estimate or predict the packet arrival delay or the available bandwidth.

The transmission method determination means 108 has a function to determine a most appropriate amount of data for segmenting data and the most appropriate number of connections on the basis of the state of the communication network estimated or predicted by the transmission-side network state monitoring means 107. The transmission method determination means 108 notifies the data segmenting means 103, the data distribution means 104, and the transmission-side connection management means 106 of a result of the determination.

When the amount of data for segmenting data is changed, the data segmenting means 103 changes a unit for segmenting media data to be input.

When the number of connections is increased, the transmission-side connection management means 106 establishes an additional TCP connection(s) from an additional transmission means to a additional receiving means of the receiving device 200. Thereafter, communication is started between the additional transmission means and an additional receiving means.

When the number of connections is decreased, the transmission-side connection management means 106 cuts an arbitrary transmission means 105*m*. The data distribution means 104 operates in such a way that data are distributed to an updated group of transmission means after the number of connections is changed.

The receiving means 201₁ to 201*n* have a function to receive data packets transmitted from the transmission means 105₁ to 105*n* of the transmission device 100.

The data composition means 202 has a function to reorganize and composite the data packets received by the plurality of receiving means.

The data composition means 202 judges whether or not arrival times of the data packets received by the receiving means 201₁ to 201*n* are within an allowable delay time. When a packet(s) has/have arrived within the allowable delay time, the data composition means 202 decodes the packet(s) that has/have arrived. When a packet(s) has/have not arrived within the allowable delay time, the data composition means 202 treats the packet(s) that has/have not arrived as a lost packet(s).

The reproduction means 203 has a function to reproduce the media data decoded by the data composition means 202.

The receiving-side connection management means 204 has a function to monitor the states of the receiving means 201₁ to 201*n*. The receiving-side connection management means 204 coveys the states of the receiving means 201₁ to 201*n* to the receiving-side network state monitoring means 205.

The receiving-side network state monitoring means 205 has a function to estimate or predict a current state or near-future state of the communication network on the basis of the information conveyed from the receiving-side connection management means 204 and information from a means that notifies the state of the communication network.

A method of estimation or prediction of the state of the communication network used by the receiving-side network state monitoring means 205 is, for example, the same as the method that the transmission-side network state monitoring means 107 uses. Items to be estimated or predicted for the state of the communication network by the receiving-side network state monitoring means 205 include, for example, a packet loss rate.

The receiving method determination means 206 has a function to, on the basis of the state of the communication network that is estimated or predicted by the receiving-side network state monitoring means 205, determine the most appropriate number of connections for data receiving and a delay time that the data composition means 202 allows in carrying out data composition. The receiving method determination means 206 notifies the data composition means 202 and the receiving-side connection management means 204 of a result of the determination.

When the allowable delay time is changed, the data composition means 202 changes a criterion time used in judging whether or not to treat arriving packets as lost packets in data composition.

When the number of connections is increased, the receiving-side connection management means 204 establishes an additional TCP connection(s) from an additional receiving means to a transmission means of the transmission device 100. Thereafter, communication is started between an additional transmission means and the additional receiving means.

When the number of connections is decreased, the receiving-side connection management means 204 cuts an arbitrary receiving means 201m.

Figure 4:
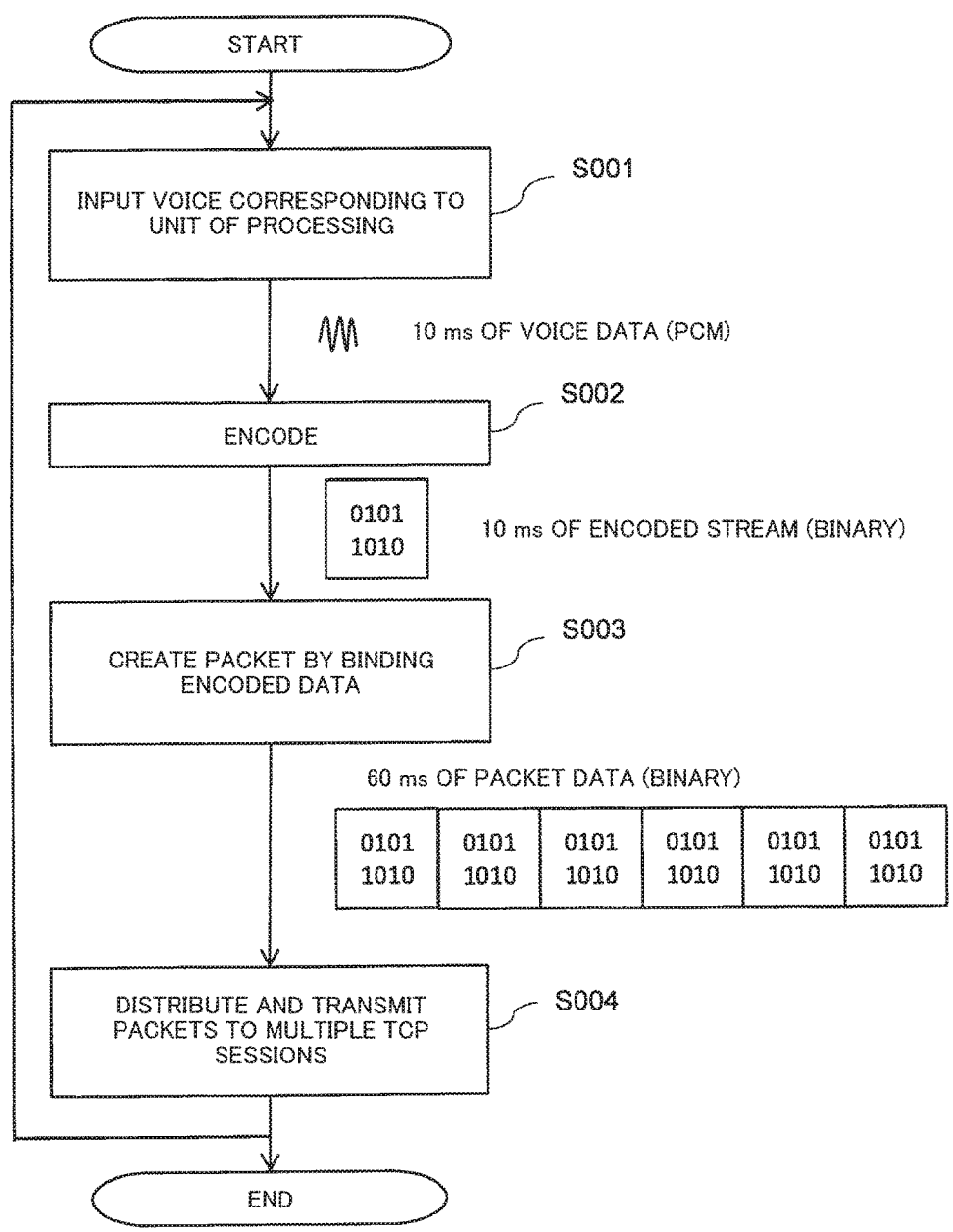
FIG. 4 is a flowchart illustrating an operation of media data transmission processing of the transmission device.

An operation when the transmission device 100 in the exemplary embodiment transmits input media data will be described below with reference to a flowchart in FIG. 4. FIG. 4 is a flowchart illustrating an operation of media data transmission processing in the first exemplary embodiment of the transmission device 100.

In the following description, a case is supposed in which the transmission device 100 transmits voice data that are input from a mike to the receiving device 200.

The media input means 101 of the transmission device 100 inputs voice data the amount of which corresponds to a unit of processing from the mike (step S001). The unit of processing of voice data is not limited particularly.

For example, it is assumed that the media input means 101 samples voice data in a voice call, which are input from the mike, at 8 kHz, quantizes the sampled voice data in 16 bits, and inputs the quantized data as PCM (Pulse-Code Modulation) data. When voice data are input every 10 milliseconds under this setting, 160 bytes of PCM data are input to the media input means 101 every 10 milliseconds.

The encoding means 102 encodes the voice data input from the mike by a predetermined method (step S002). Any method may be applied to the encoding method that the encoding means 102 uses, including a method in which PCM data are used without any change.

For the encoding method that the encoding means 102 uses, standardized encoding methods, such as G.711 and G.729, which are standardized by ITU-T (International Telecommunication Union Telecommunication Standardization Sector), AMR (Adaptive Multi Rate), standardized by 3GPP (3rd Generation Partnership Project), and AAC (Advanced Audio Coding), standardized by ISO (International Organization for Standardization), may also be used.

In the following description, it is supposed that the encoding means 102 encodes voice data by using G.711. Under this supposition, 160 bytes of PCM data input every 10 milliseconds is encoded into 80 bytes of G.711 stream every 10 milliseconds.

Next, the data segmenting means 103 combines together the encoded G.711 streams into a unit of packet transmission (step S003). The transmission device 100 may transmit 10 milliseconds of data as a packet without any change. The transmission device 100 may also transmit a certain number of packets each of which contains 10 milliseconds of data in combination.

In the example illustrated in FIG. 4, six pieces of 10 milliseconds of G.711 data are combined together into a packet. Transmitting packets without combining the packets together has an advantage in that waiting time for packet creation is short for the receiving device 200 side. However, transmitting packets without combining the packets together also has an disadvantage in that, since a load of transmission and reception becomes higher and the ratio of packet header rises due to an increase in the number of packets to be transmitted, a load on the communication network becomes higher.

Transmitting packets by combining the packets together has an advantage in that a load of transmission and reception and a load on the communication network become lower. However, combining packets together causes a disadvantage in that delay time of packet arrivals becomes longer.

The data distribution means 104 distributes packets, each of which is created by combining together pieces of encoded data, to a plurality of transmission means. The transmission means transmits the distributed packets (step S004).

The data distribution means 104 may assign each packet to a transmission means in order, such as assigning the first packet to the transmission means 1051, the second packet to the transmission means 1052, the n-th packet to the transmission means 105n, and the (n+1)-th packet to the transmission means 1051. The data distribution means 104 may also monitor the state of each transmission means and use a transmission means with a small transmission delay preferentially.

When the data distribution means 104 assigns the transmission means to packets to be transmitted in order, the receiving device 200 is also able to reorganize the packets by receiving the packets in order. When the data distribution means 104 gives preference to transmission means having a small transmission delay in assigning the transmission means to packets to be transmitted, transmitted packets are required to have time stamp information given so that the packets are reorganized on the receiving side.

Thereafter, the transmission device 100 repeats the transmission processing for input voice data. When no more voice data are input, the transmission device 100 ends the media data transmission processing.

Figure 5:
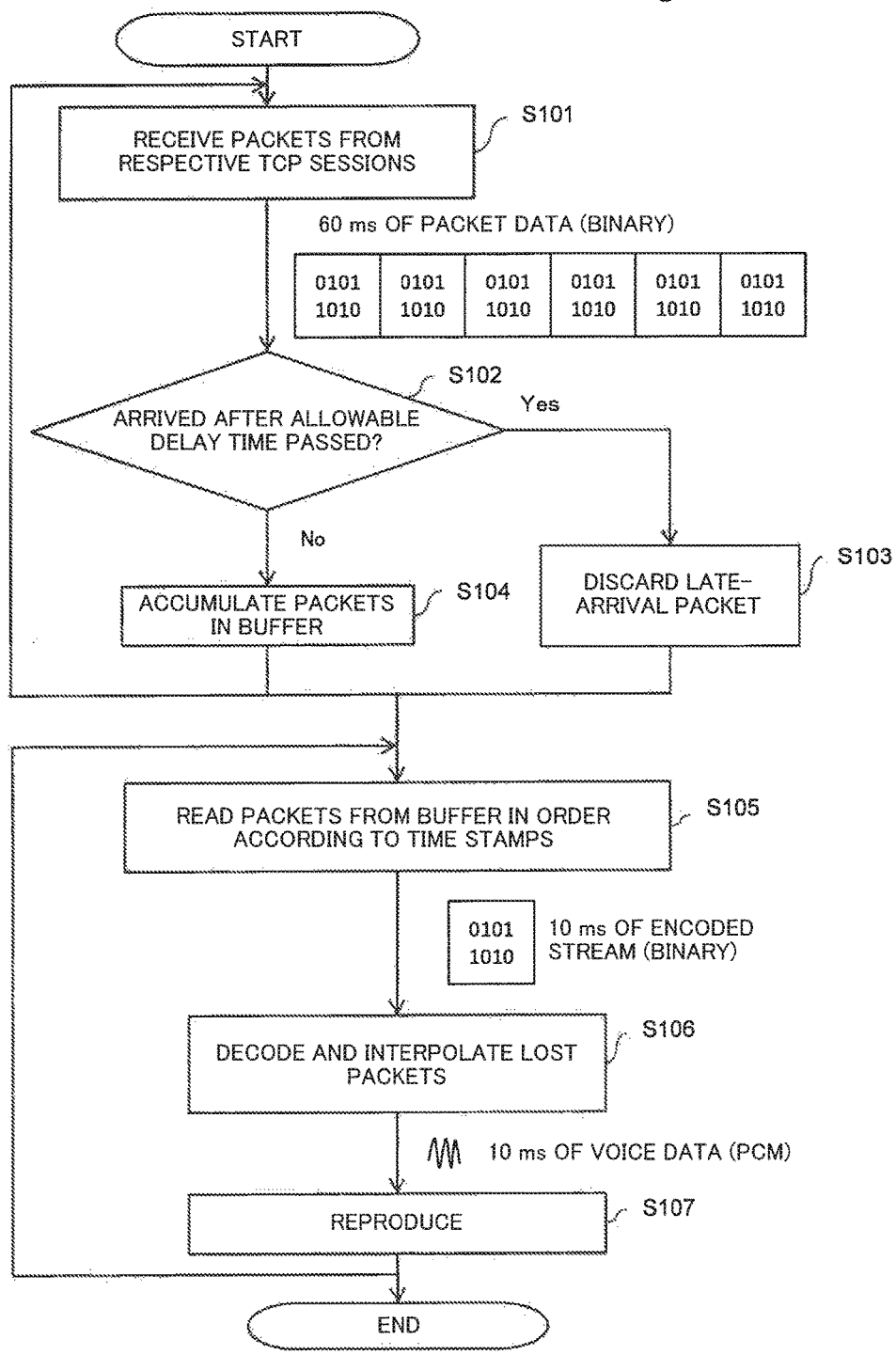
FIG. 5 is a flowchart illustrating an operation of media data reproduction processing of the receiving device.

Next, an operation when the receiving device 200 in the exemplary embodiment reproduces received media data will be described with reference to a flowchart in FIG. 5. FIG. 5 is a flowchart illustrating an operation of media data reproduction processing in the first exemplary embodiment of the receiving device 200.

In the following description, a case is supposed in which the receiving device 200 reproduces voice data input from the mike and transmitted by the transmission device 100.

The receiving means of the receiving device 200 receives data packets that have arrived (step S101).

Next, on the basis of the arrival times of the packets that have arrived, the data composition means 202 judges whether the packets have arrived within an allowable delay time or after the allowable delay time had passed (step S102).

For example, when the allowable delay time is set at 100 milliseconds, if a piece of voice data transmitted 1 second (1000 milliseconds) after the transmission of the first piece of voice data has arrived within 1.1 seconds (within 1100 milliseconds) from the time at which the reproduction was started, the data composition means 202 judges that the piece of voice data has arrived in time for the allowable delay time. If the piece of voice data has not arrived within 1.1 seconds from the time at which the reproduction was started, the data composition means 202 judges that the packet is arriving too late.

The data composition means 202 discards a packet(s) that is/are judged to have arrived after the allowable delay time had passed (Yes in step S102) (step S103). The data composition means 202 accumulates a packet(s) that is/are judged to have arrived within the allowable delay time (No in step S102) in a buffer (step S104). Thereafter, the data composition means 202 repeats the judgment processing for packets input from the receiving means.

Packets accumulated in the buffer are read out in the order of time stamps (step S105). In reading out packets in order, the data composition means 202 may divide the packets generated in units of, for example, 60 milliseconds into pieces of packet data separated in units of a quantity required for reproduction and carry out succeeding processing for the divided packets. The unit of a quantity required for reproduction is, for example, a unit of 10 milliseconds.

The data composition means 202 decodes the packets read out from the buffer (step S106). The data composition means 202, for example, decodes the packets encoded using G.711 into PCM data.

When the packets are composited, since a packet(s) that has/have not arrived within the allowable delay time has/have been discarded in step S103, a vacant spot(s) may exist between packets. In this case, by regarding the discarded packet(s) as a period(s) of silence, the data composition means 202 may insert 10 milliseconds of PCM data that have a value of 0 into the spot(s) where no packet occupies.

The data composition means 202 may also make voice data corresponding to the discarded packet(s) unnoticeable by applying packet loss concealment processing (PLC) as stipulated in G.711 Appendix I.

The reproduction means 203 reproduces the voice data that are decoded or interpolated with PLC by the data composition means 202 (step S107). Thereafter, the data composition means 202 reads out packets accumulated in the buffer and repeats the composition processing for the packets. When no accumulated packet is left in the buffer, the receiving device 200 ends the reproduction processing.

Figure 6:
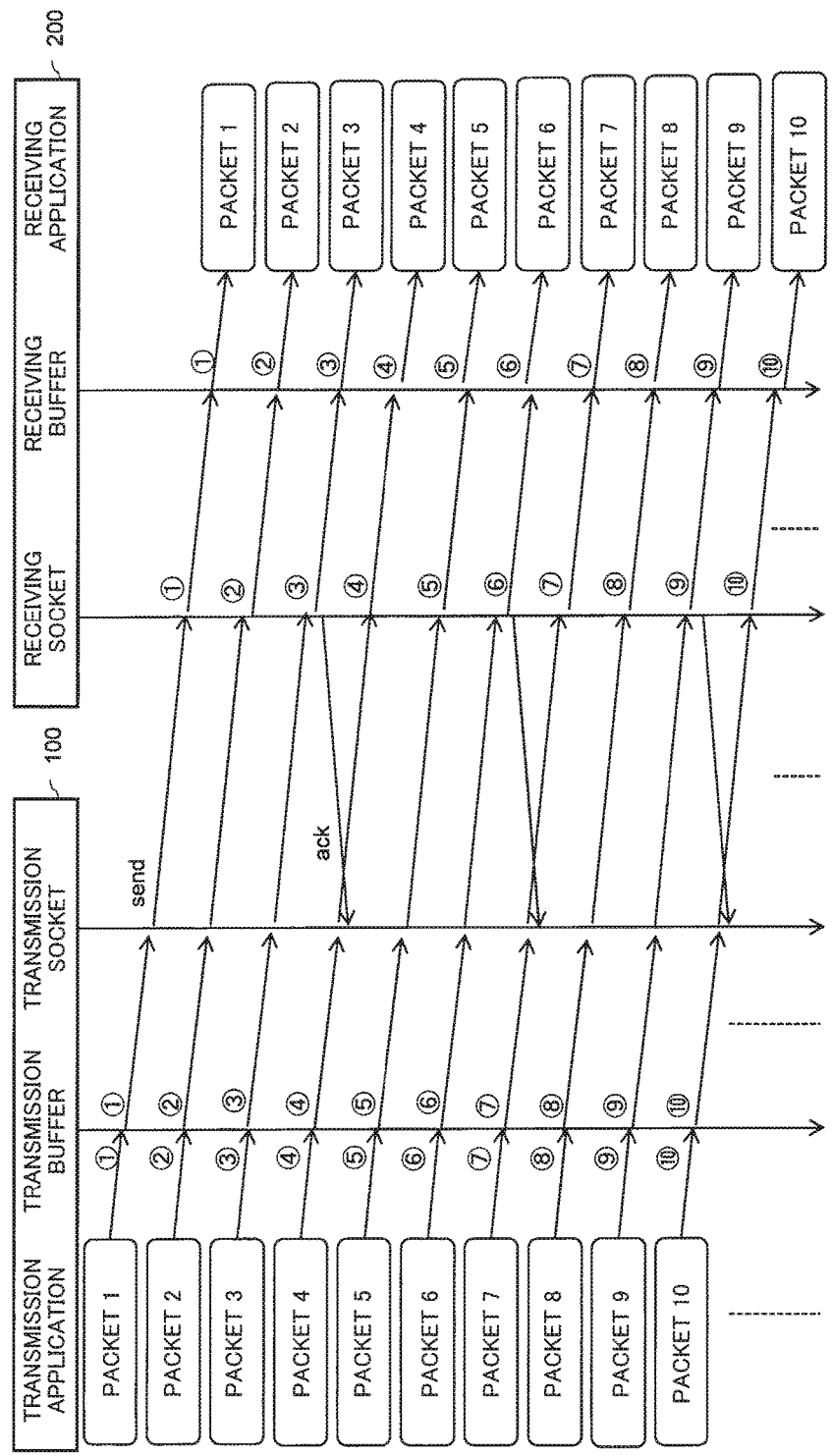
FIG. 6 is an explanatory diagram illustrating an example of a behavior of packet communication in the case of using one TCP connection.
Figure 7:
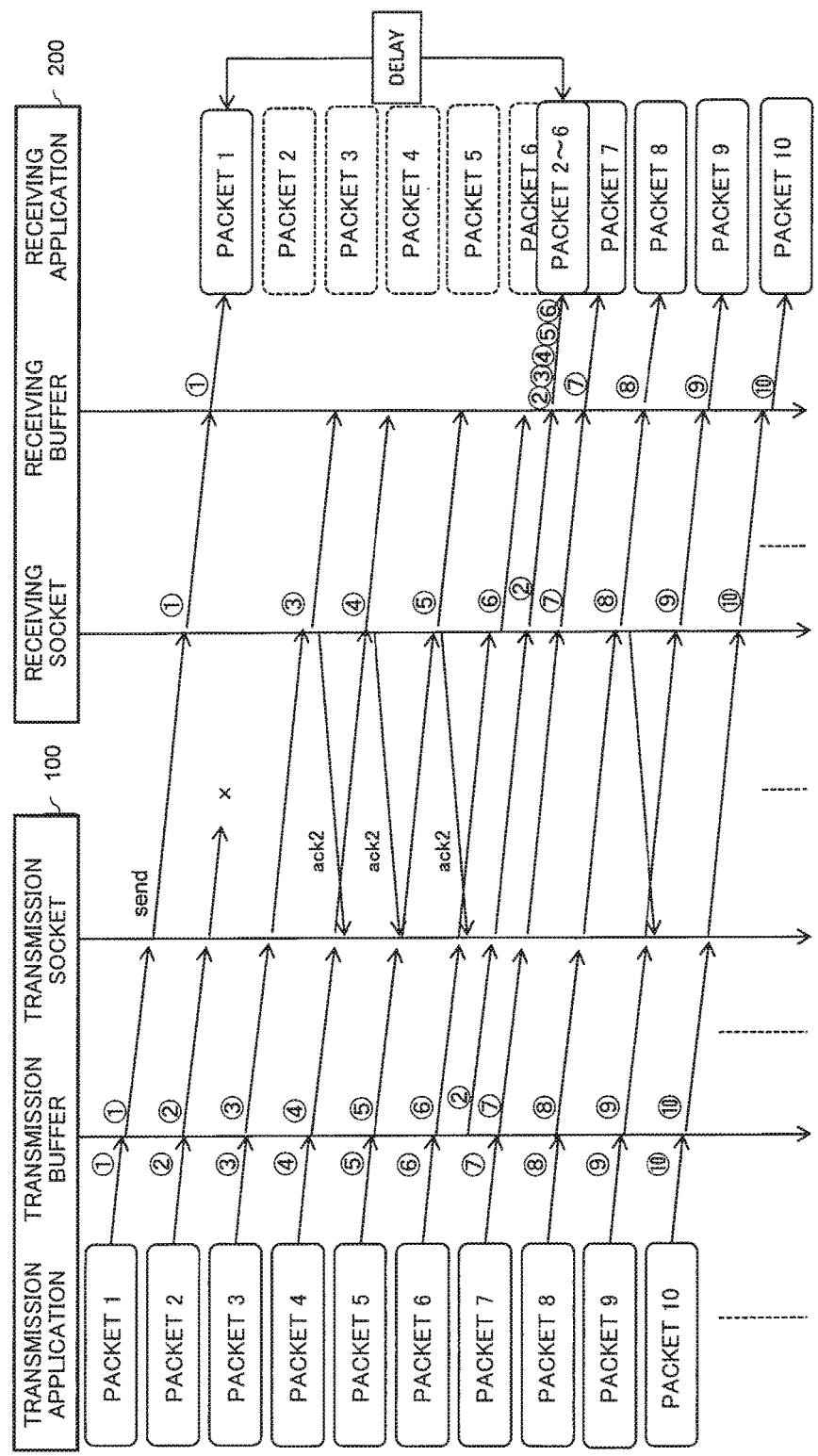
FIG. 7 is an explanatory diagram illustrating an example of the behavior of the packet communication in the case of using one TCP connection.

A data communication method and a data composition method using a plurality of TCP connections in the exemplary embodiment will be described below with reference to FIGS. 6 to 9. FIG. 6 is an explanatory diagram illustrating an example of a behavior of packet communication using one TCP connection. FIG. 7 is an explanatory diagram illustrating another example of the behavior in the packet communication using one TCP connection.

As illustrated in FIG. 6, in the transmission device 100, an application, indicated by 'transmission application', operates that carries out data communication processing, which is carried out by the components ranging from the media input means 101 to the transmission means 1051.

In the case of data communication using a TCP connection, the data communication is carried out by using an abstraction interface, which is referred to as a socket. The transmission application, which is an application running on an OS (Operating System), writes packet data to be transmitted into the buffer of a socket.

Socket communication is implemented in a library or the kernel of the OS. The packet data written into the buffer are transmitted to the IP network 300 with a timing independent of writing into the socket buffer by the application.

As illustrated in FIG. 6, the receiving device 200 also uses a socket interface. In the receiving device 200, an application, indicated by 'receiving application', operates that carries out data reproduction processing, which is carried out by the components ranging from the receiving means 2011 to the reproduction means 203.

A process up to the reproduction of voice data includes a step in which a receiving socket first receives packet data that have been delivered from the IP network 300 and a step in which the receiving socket writes the packet data into a receiving buffer. When the receiving socket has written the packet data into a receiving buffer, an event, such as an interruption, to the receiving application is caused. The process further includes a step in which, in response to the caused event, the receiving application receives the packet data from the receiving buffer and carries out reproduction processing.

FIG. 6 illustrates a behavior in which the transmission application transmits 10 packets to the receiving application regularly without causing any packet loss on the way for the packets. When the transmission application has written respective packets into the transmission buffer, the respective packets are transmitted to the receiving application in order via the socket. Since data communication without packet loss is carried out in a TCP connection, the receiving socket regularly returns an indication of 'how far the sockets has received packets' by an ACK (ACKnowledgement) packet. In the example illustrated in FIG. 6, the receiving socket returns an ACK packet every time the socket receives three packets.

FIG. 7 illustrates an example in which, due to an occurrence of packet loss on the way, packet 2 does not reach the receiving device 200. The transmission device 100 transmits packet 1, packet 2, packet 3, and so on in this order. However, because of loss of packet 2, packet 3 arrives to the receiving device 200 after packet 1 has been received.

At this time, the receiving socket of the receiving device 200 returns an ACK packet informing that 'packet 2 has not arrived' to the transmission socket of the transmission device 100. In general, merely receiving an ACK packet informing that 'a packet has not arrived' once does not make the transmission socket retransmit the packet that has not arrived. The transmission socket does not retransmit a lost packet unless receiving the ACK packet several times.

In the example illustrated in FIG. 7, at the points of time when packets 4 and 5 have arrived to the receiving socket, the ACK packets informing that 'packet 2 has not arrived' are transmitted individually. As a result, since the fact that 'packet 2 has not arrived' is conveyed to the transmission socket three times, the transmission socket retransmits packet 2. To the receiving device 200, packet 2 arrives after packet 6 has arrived.

In the case of data communication using a TCP connection, an event is caused in the application after data are arranged in a proper order. That is, packets 3 to 6, which have already arrived in the receiving buffer, are finally used when packet 2 arrives.

In usual data communication, a small arrival delay does not invite a substantial problem. However, in the communication of real time data, the arrival delays due to packet retransmission become a cause for deterioration in voice quality. In the example illustrated in FIG. 7, if packets are transmitted in units of 20 milliseconds, packet 2 arrives with a delay of approximately 80 milliseconds or longer. As described thus far, it is difficult to achieve real-time data communication by using only one TCP connection.

Figure 8:
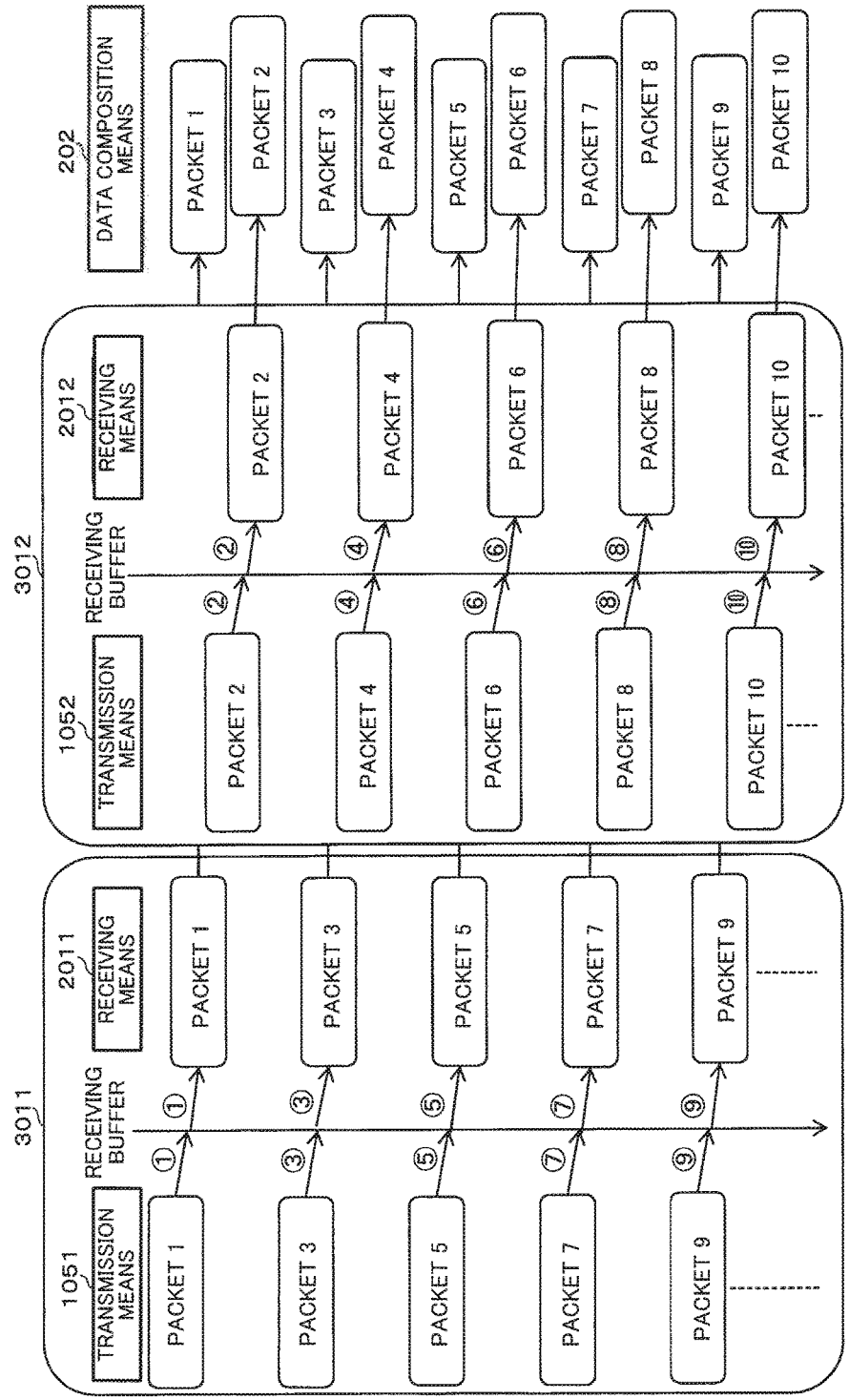
FIG. 8 is an explanatory diagram illustrating an example of a behavior of packet communication in the case of using two TCP connections.
Figure 9:
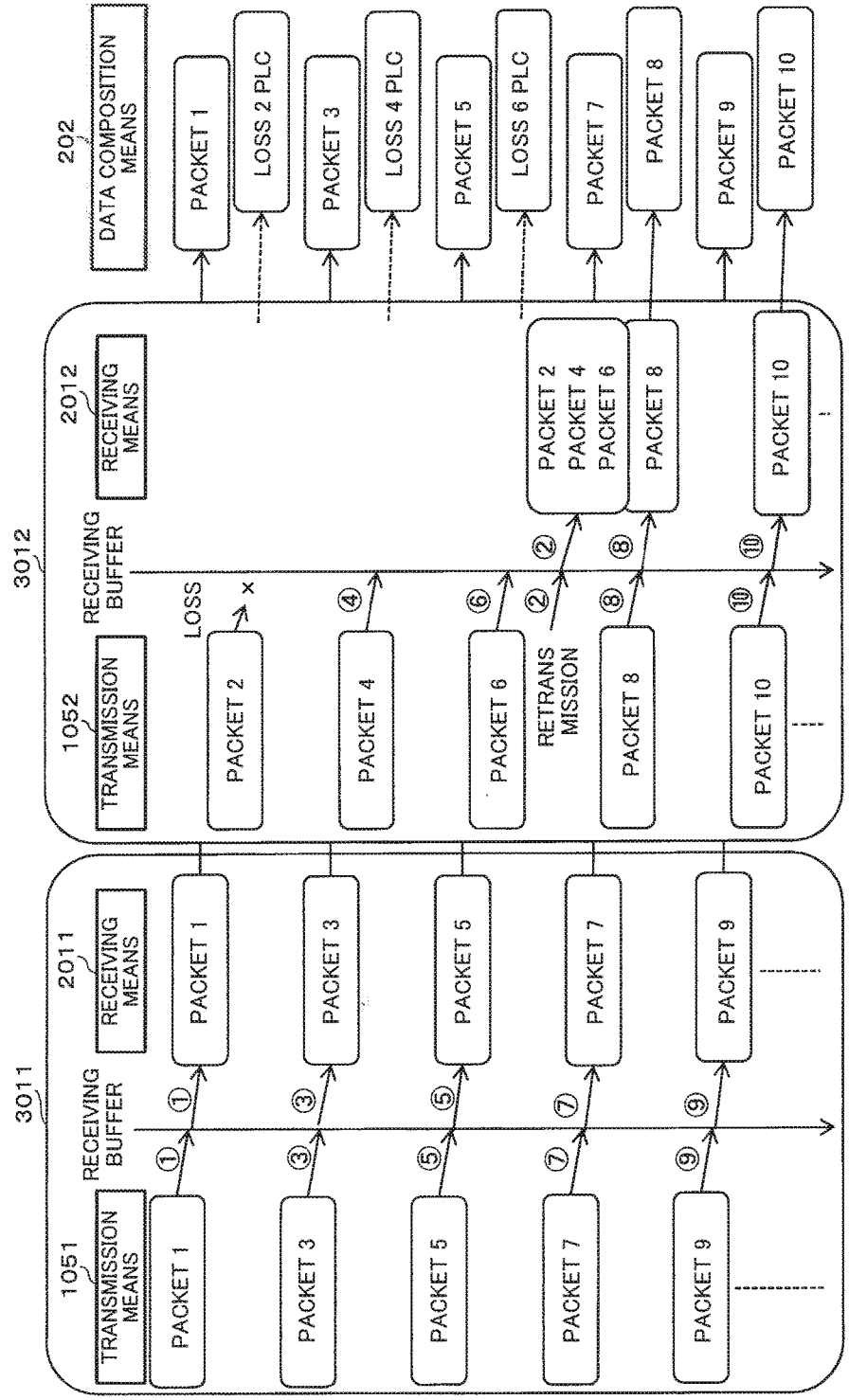
FIG. 9 is an explanatory diagram illustrating an example of the behavior of the packet communication in the case of using two TCP connection.

FIG. 8 is an explanatory diagram illustrating an example of a behavior of packet communication in the case of using two TCP connections. FIG. 9 is an explanatory diagram illustrating another example of the behavior of the packet communication in the case of using two TCP connections.

The transmission device 100 distributes packets so as to transmit odd-numbered packets and even-numbered packets by using the transmission means 1051 and the transmission means 1052, respectively. The receiving means 2011 receives odd-numbered packets. The receiving means 2012 receives even-numbered packets.

In the example illustrated in FIG. 8, since no packet loss occurs, the packets transmitted by the transmission means 1051 and the transmission means 1052 are received by the receiving means 2011 and the receiving means 2012, respectively, without delay. The packets received by the receiving means 2011 and the receiving means 2012 are handed over to the data composition means 202. The data composition means 202 reorganizes the handed-over packets in the order of packets. The reproduction means 203 reproduces the reorganized voice.

In the example illustrated in FIG. 9, a packet loss has occurred. As with the example illustrated in FIG. 8, the transmission device 100 distributes odd-numbered packets and even-numbered packets to the transmission means 1051 and the transmission means 1052, respectively, using two TCP connections.

In the example illustrated in FIG. 9, since no packet loss has occurred in the TCP connection 3011, the odd-numbered packets are received by the receiving means 2011 without delay. On the other hand, since a packet loss has occurred to packet 2 in the TCP connection 3012, retransmission delays of packets are caused. To the receiving means 2012, packets 2, 4, and 6 arrive belatedly.

The data composition means 202 treats a packet(s) that do(es) not arrive within the allowable delay time as a lost packet(s). In the example illustrated in FIG. 9, the data composition means 202 is configured to treat a packet(s) that has/have arrived late by one packet as a lost packet(s). Thus, the data composition means 202 carries out data composition processing for arriving packets in a first-come-first-serve manner and treats packets 2, 4, and 6, which do not arrive within the allowable delay time, as lost packets. The data composition means 202 makes unnoticeable the spot(s) where a packet loss(es) has/have occurred by the PLC in carrying out composition. The reproduction means 203 reproduces the data composited in such a way.

With such a configuration as described above, when a plurality of TCP connections are used, even if a delay is caused in the arrivals of packets delivered through a specific TCP connection, the media communication system of the exemplary embodiment is capable of carrying out data reproduction processing without delay by treating the delayed packet(s) as a lost packet(s). When a spot(s) where a packet loss(es) has/have occurred is/are made unnoticeable, the media communication system is capable of preventing deterioration in sound quality.

Determination methods of the number of TCP connections between the transmission device 100 and the receiving device 200, a data segmentation interval in the data segmenting means 103, and an allowable delay time in the data composition means 202 in the exemplary embodiment will be described below individually.

First, a method to determine an allowable delay time will be described below. As described above, when a packet loss occurs, a packet arrives late to the receiving device 200. That is, in an environment where a lot of packet losses occur, the number of packets that arrive after an allowable delay time has passed increases. The data composition means 202 composites data by treating a packet(s) that arrive(s) after the allowable delay time has passed as a lost packet(s).

When a voice packet(s) do(es) not arrive, deterioration in sound quality is caused at a spot(s) where a lost packet(s) that has/have not arrived is/are expected to occupy. Although, in the example illustrated in FIG. 9, or the like, deterioration in sound quality is made unnoticeable by the PLC, controlling packet losses not to occur as much as possible makes it possible to reproduce a voice with high sound quality. Thus, determination methods of an allowable delay time include a method in which, in the case of the small number of packet losses, the allowable delay time in the data composition means 202 is set short, and as the number of packet losses increases, the allowable delay time is lengthened.

Specifically, in the above-described method, for example, the allowable delay time is set at approximately 100 milliseconds until the packet loss rate rises to approximately 1%, and the allowable delay time is lengthened to 400 milliseconds, which is a limit to the delay time of IP telephone, as stipulated by the Ministry of Internal Affairs and Communications stipulates, at the packet loss rate of 10%.

Next, a method to determine the number of TCP connections will be described below. When a packet loss(es) occur(s), increasing the number of TCP connections makes it possible to reduce a delay. That is because, as described above, even when a packet loss(es) occur(s) in a TCP connection and an arrival delay(s) is/are caused because of retransmission of a TCP packet(s), no delay is caused to the whole voice data if a succeeding packet(s) is/are arriving to (an)other TCP connection(s).

Thus, for the method to determine the number of TCP connections, a method in which, as the number of packet losses increases, the number of TCP connections is increased is preferable. Specifically, in the method, for example, the number of TCP connections is set at approximately 2 when the packet loss rate takes a value of approximately 1%, and, as the number of packet losses increases, the number of TCP connections is increased to approximately 5.

Next, a method to determine a data segmentation interval will be described below. The data segmentation interval is a parameter that, for example, when a voice input interval is 10 milliseconds, determines whether transmitting voice data by distributing a piece of data to each TCP connection every 10 milliseconds or by combining six pieces of data together and distributing the combined data to each TCP connection every 60 milliseconds.

When a packet loss occurs infrequently, since a delay(s) due to the packet loss(es) is/are small, an arbitrary data segmentation interval may be employed. In this case, lengthening the segmentation interval within the range of allowable delay tends to decrease the number of packet losses and cause deterioration in sound quality to become unnoticeable.

On the other hand, when a packet loss occurs frequently, it is better to shorten the segmentation interval and increase the number of packets. That is because, when the number of packets to be transmitted is large, time to retransmit a packet becomes short even if a packet loss(es) occur(s).

Although, in the above description, methods to determine the number of TCP connections, a data segmentation interval, and an allowable delay time in the data composition means 202 on the basis of the state of packet loss occurrence were described individually, the transmission-side network state monitoring means 107 and the receiving-side network state monitoring means 205 may achieve determination of the number of TCP connections, the data segmentation interval, and the allowable delay time by measuring packet loss rates individually.

The receiving means of the receiving device 200 may estimate an occurrence(s) of a packet loss(es) by observing arrival delays of packets and the number of packets that arrive simultaneously, and detecting the state of arrival delays and simultaneous arrivals of packets that are originally expected to arrive separately with a predetermined interval.

By carrying out monitoring at the IP layer in the TCP/IP hierarchy, the number of actual losses in TCP/IP, the number of retransmission attempts, the number of retransmission requests using ACK packets, the amount of accumulated data in the transmission buffer and the receiving buffer, and the like, may be monitored, and the number of packet losses may be estimated from these monitoring items.

Figure 10:
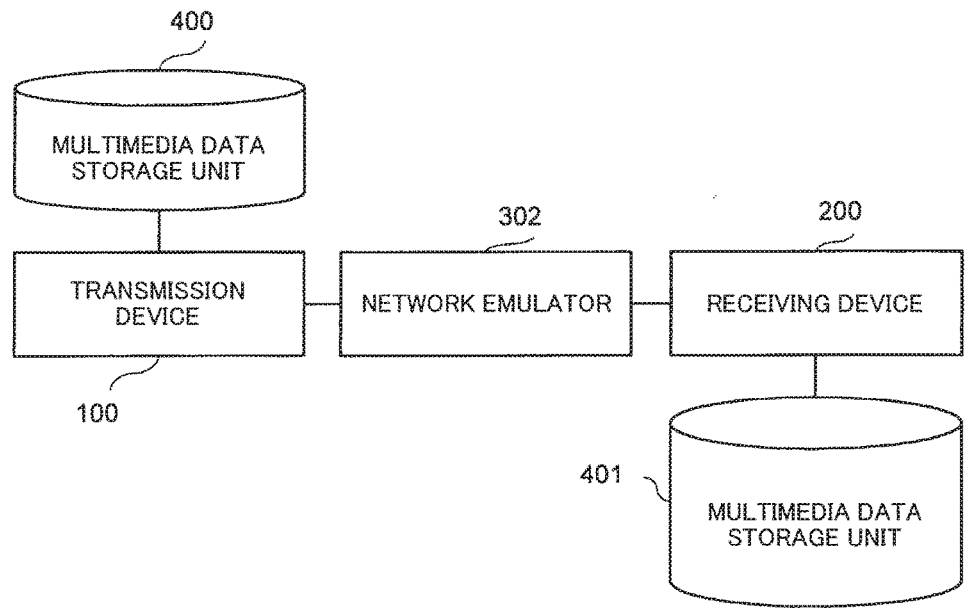
FIG. 10 is a system configuration diagram illustrating a configuration of a system that is used for evaluating an effect from the media communication system.

Using FIGS. 10 to 13, an effect in that changing a transmission method and a receiving method makes it possible to improve sound quality will be described below. FIG. 10 is a system configuration diagram illustrating a configuration of a system that was used to evaluate an effect mediated by the media communication system of the exemplary embodiment. As illustrated in FIG. 10, the transmission device 100 reads data from the multimedia data storage unit 400. The transmission device 100 transmits the read data to the receiving device 200 via a network emulator 302.

The data stored in the multimedia data storage unit 400 is data obtained by sampling, at 8 kHz, and encoding, using ITU-T G.711 μ-law, 6 minutes 43 seconds of voice data that is created by binding together voice sequence samples in 11 languages from two males and two females per language, that is, 44 samples in total, which are obtainable from ITU-T P.501 "Test signals for use in telephonometry". The encoded multimedia data become 64 kbps voice data.

The transmission device 100, while reading data from the multimedia data storage unit 400 regularly, transmits the read data to the receiving device 200. The transmission device 100 transmitted data while changing the time interval for reading from five different values, namely 10 milliseconds, 20 milliseconds, 30 milliseconds, 40 milliseconds, and 60 milliseconds. The attempts are equivalent to the transmission device 100 transmitting multimedia data while segmenting the multimedia data into blocks of 80 bytes each, 160 bytes each, 240 bytes each, 320 bytes each, and 480 bytes each, respectively. The transmission device 100 and the receiving device 200 are interconnected by TCP connections. The transmission device 100 transmitted data while changing the number of TCP connections from one to five, one at a time.

The receiving device 200 reorganized the multimedia data while changing the allowable delay time for data packets received from one or a plurality of TCP connections. The receiving device 200 stored the reorganized data in a multimedia data storage unit 401. The receiving device 200 changed the allowable delay time from 100 milliseconds to 200 milliseconds to 400 milliseconds.

As a method to evaluate sound quality, a method was used in which data before transmission, which are stored in the multimedia data storage unit 400, and reorganized data, which are stored in the multimedia data storage unit 401, are decoded into PCM data individually, and the degree of deterioration in sound quality is measured by using ITU-T P.862 "Perceptual evaluation of speech quality (PESQ): An objective method for end-to-end speech quality assessment of narrow-band telephone networks and speech codecs".

PESQ is a method to measure deterioration of voice in the telephone band objectively. PESQ is also a method to estimate the degree of deterioration from a reference sound source (that is, the data stored in the multimedia data storage unit 400) on the basis of an auditory psychological model of human beings, and has a high correlation with MOS (Mean Opinion Score), which is a subjective quality. Scoring of MOS is done with grades 1 to 5: grade 5 is the best and grade 1 is the worst. Grade 3 means 'fair' and 'having slightly annoying deterioration'. Thus, in the following description, when evaluation by PESQ results in grade 3 or higher, it will be judged that no problem is caused in sound quality.

The network emulator 302 changes the packet loss rate and a communication network delay time. By carrying out the changes, an influence that a change in the state of the communication network gives to the sound quality (PESQ score) of reorganized multimedia data is measured. The network emulator 302 changed the packet loss rate and the communication network delay time from 0.1% up to 10% and from 20 milliseconds to 100 milliseconds to 400 milliseconds, respectively.

Figure 11:
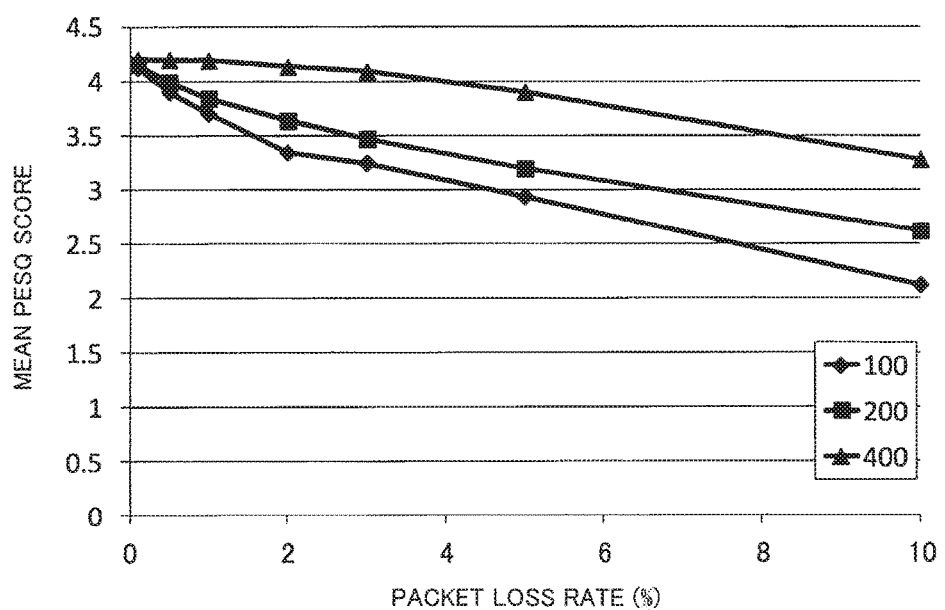
FIG. 11 is an explanatory diagram illustrating relations between a packet loss rate and a mean PESQ score in graphs corresponding to values of an allowable delay.

FIG. 11 is an explanatory diagram illustrating relations between the packet loss rate and the mean PESQ score in graphs corresponding to different values of the allowable delay. The horizontal axis represents the packet loss rate (%), and the vertical axis represents the mean PESQ score. In FIG. 11, a graph specified by a symbol "100" illustrates a relation between the packet loss rate and the mean PESQ score when the allowable delay time is set at 100 milliseconds. In a similar manner, graphs specified by symbols "200" and "400" illustrate relations between the packet loss rate and the mean PESQ score when the allowable delay time is set at 200 milliseconds and 400 milliseconds, respectively.

FIG. 11 illustrates cases in which data transmission and reception are carried out with the communication network delay time, the packet transmission interval, and the number of simultaneous connections set at 20 milliseconds, 20 milliseconds, and 5, respectively. As illustrated in FIG. 11, it is shown that, regardless of the packet loss rate, the longer the allowable delay time is, the higher the mean PESQ score becomes, that is, the higher the sound quality becomes. When the packet loss rate is 1% or lower, the mean PESQ score has a value of 3.5 or higher even with an allowable delay time of 100 milliseconds, which shows that voice hearing with low latency and high sound quality can be achieved.

When the packet loss rate has risen to 10%, it is required to set the allowable delay time at 400 milliseconds to obtain a mean PESQ score of 3 or higher. As described above, changing the allowable delay time in accordance with the packet loss rate makes it possible to maintain voice quality.

Figure 12:
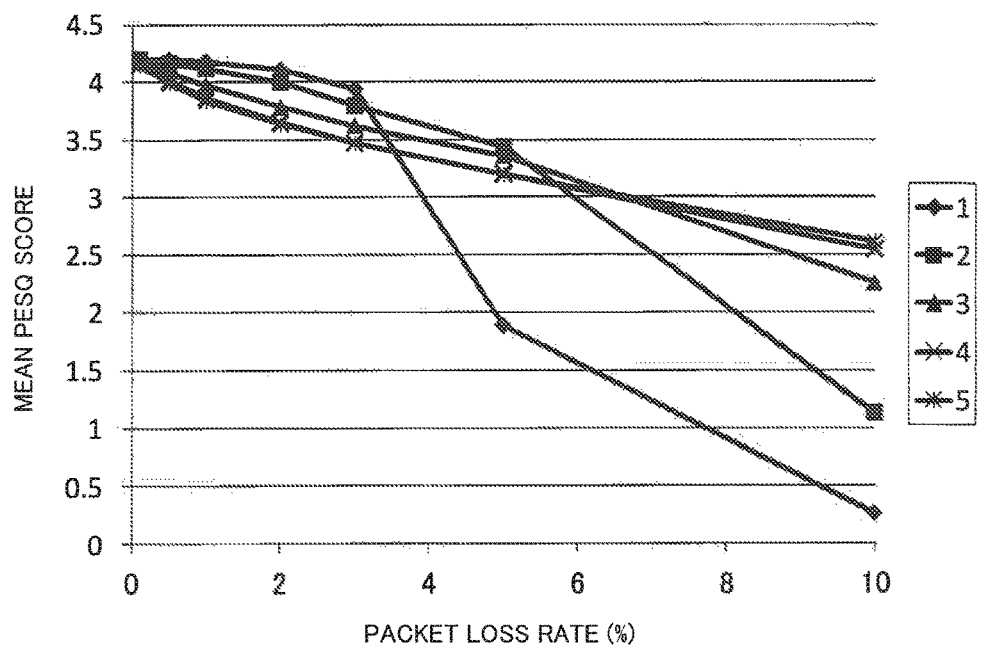
FIG. 12 is an explanatory diagram illustrating relations between the packet loss rate and the mean PESQ score in graphs corresponding to the numbers of parallel connections.

FIG. 12 is an explanatory diagram illustrating relations between the packet loss rate and the mean PESQ score in graphs corresponding to the different numbers of parallel connections. The horizontal axis represents the packet loss rate (%), and the vertical axis represents the mean PESQ score. In FIG. 12, a graph specified by a symbol "1" illustrates a relation between the packet loss rate and the mean PESQ score when the number of parallel connections is set at 1. In a similar manner, graphs specified by symbols "2" to "5" illustrate relations between the packet loss rate and the mean PESQ score when the number of parallel connections is set at 2 to 5, respectively.

FIG. 12 illustrates cases in which data transmissions and reception are carried out with the communication network delay time, the packet transmission interval, and the allowable delay time set at 20 milliseconds, 20 milliseconds, 200 milliseconds, respectively. As illustrated in FIG. 12, it is shown that, when the packet loss rate is 3% or lower, the fewer the number of connections is, the higher the sound quality becomes. When the packet loss rate rises higher, the greater the number of connections is, the higher the mean PESQ score becomes. As described above, changing the number of connections in accordance with the packet loss rate makes it possible to maintain voice quality.

Figure 13:
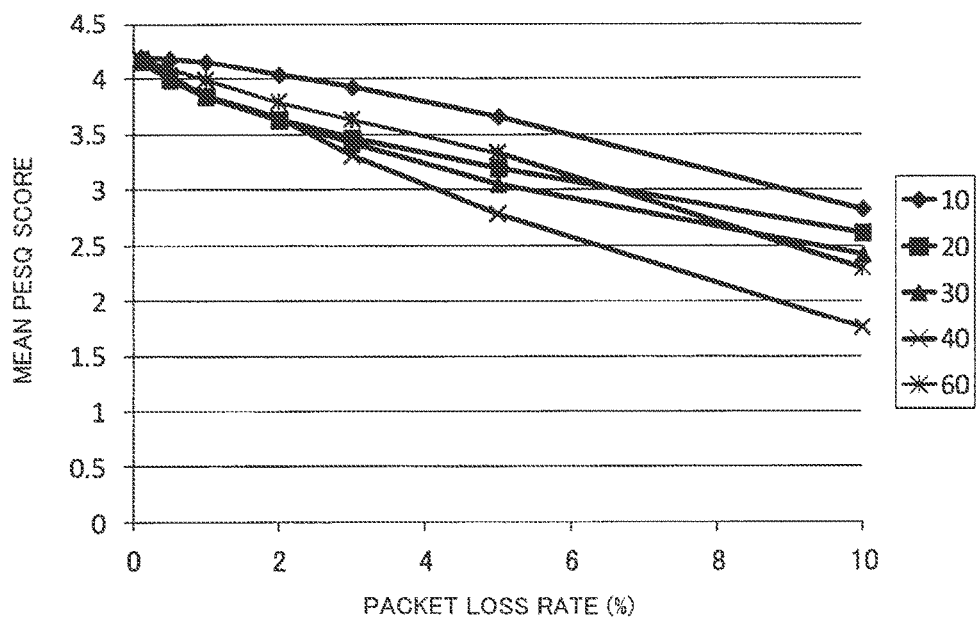
FIG. 13 is an explanatory diagram illustrating relations between the packet loss rate and the mean PESQ score in graphs corresponding to values of a packet transmission interval.

FIG. 13 is an explanatory diagram illustrating relations between the packet loss rate and the mean PESQ score in graphs corresponding to different values of the packet transmission interval. The horizontal axis represents the packet loss rate (%), and the vertical axis represents the mean PESQ score. In FIG. 13, a graph specified by a symbol "10" illustrates a relation between the packet loss rate and the mean PESQ score when the packet transmission interval is set at 10 milliseconds. In a similar manner, graphs specified by symbols "20" to "60" illustrate relations between the packet loss rate and the mean PESQ score when the packet transmission interval is set at 20 milliseconds to 60 milliseconds, respectively.

FIG. 13 illustrates cases in which data transmission and reception are carried out with the communication network delay time, the number of connections, and the allowable delay time set at 20 milliseconds, 5, and 200 milliseconds, respectively. As illustrated in FIG. 13, regardless of the packet loss rate, the mean PESQ score takes highest values when the packet transmission interval is set at 10 milliseconds. When the packet loss rate is low, since deterioration in sound quality is small even if the packet transmission interval is lengthened, shortening the packet transmission interval to reduce the number of packet transmission attempts makes it expectable to decrease a load on the communication network.

When the packet loss rate is high, since deterioration in sound quality becomes severer as the packet transmission interval is lengthened, shortening the packet transmission interval to the extent possible makes it possible to maintain voice quality in the case of a high packet loss rate.

The media communication system of the exemplary embodiment is capable of achieving low latency media communication by establishing one or a plurality of TCP connections between the transmission device and the receiving device, segmenting media data, which are a transmission target, into a plurality of packets, transmitting the plurality of packets by distributing the packets to different established TCP connections, treating packets that do not arrive within an allowable delay time as lost packets in the receiving device, and reorganizing the media data. Furthermore, by increasing or decreasing the number of TCP connections, changing the method of packet segmenting, and changing the allowable delay time on the basis of the state of the communication network, the media communication system achieves high quality media communication.

Second Exemplary Embodiment

Next, a second exemplary embodiment of the present invention will be described. Since a configuration example of a media communication system 10 in the second exemplary embodiment of the present invention is the same as the description in the first exemplary embodiment, description thereof will be omitted.

Although, in the first exemplary embodiment, data transmission is carried out through voice data input by the data segmenting means 103 being segmented and the segmented voice data being distributed to the respective transmission means 1051 to 105n by the data distribution means 104, the segmented voice data are distributed to all the transmission means 1051 to 105n in parallel in the exemplary embodiment.

In the above-described method, a transmission device 100 is required to distribute n times the amount of data compared with the first exemplary embodiment. However, since the segmented voice data being distributed to all transmission means in parallel reduces data that are treated as packet losses due to retransmission delay, deterioration in sound quality is prevented. The communication method in the exemplary embodiment will be referred to as redundant communication.

Figure 14:
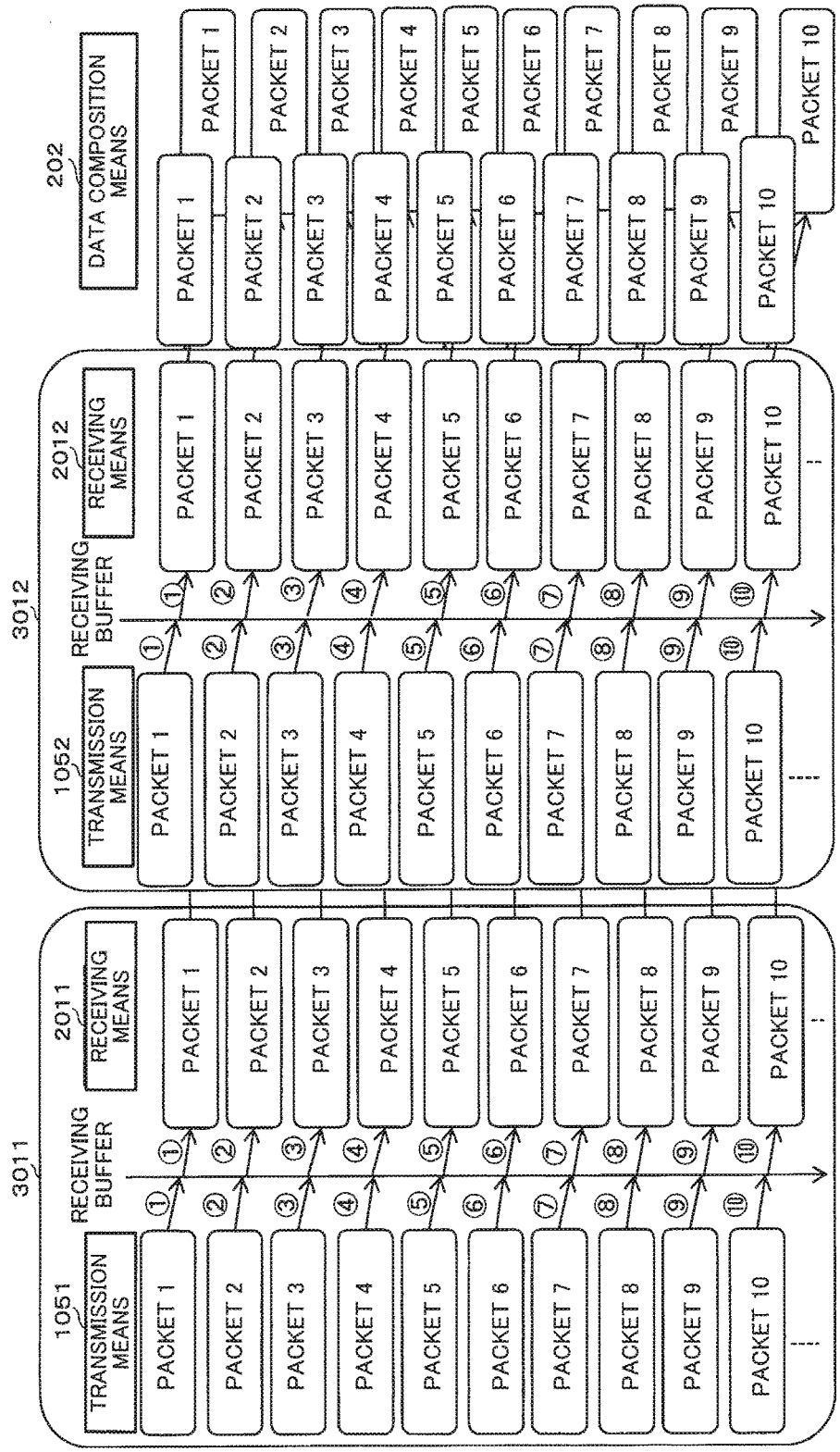
FIG. 14 is an explanatory diagram illustrating an example of a behavior of redundant communication in the case of using two TCP connections.
Figure 15:
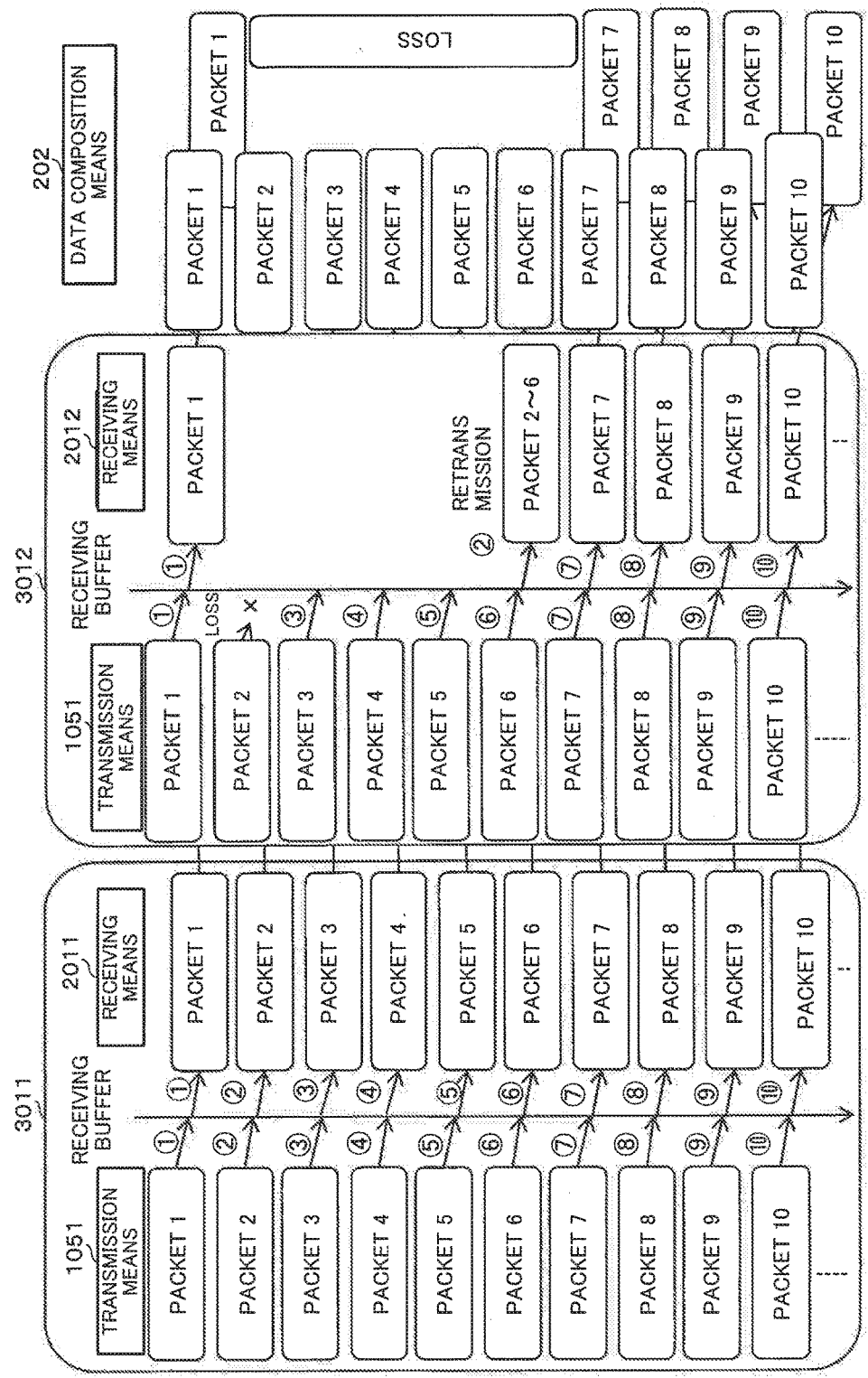
FIG. 15 is an explanatory diagram illustrating an example of the behavior of the redundant communication in the case of using two TCP connections.

Hereinafter, an operation example of the redundant communication in the exemplary embodiment will be illustrated in FIGS. 14 and 15. FIG. 14 is an explanatory diagram illustrating an example of a behavior of the redundant communication in the case of using two TCP connections. FIG. 15 is an explanatory diagram illustrating another example of the behavior of the redundant communication in the case of using two TCP connections.

FIG. 14 illustrates an example in which identical packets are transmitted through two TCP connection in parallel. Since identical packets are transmitted from the transmission means 1051 and the transmission means 1052 at almost the same time, the identical packets arrive to a receiving means 2011 and a receiving means 2012 at almost the same time. Although two identical received packets arrive to a data composition means 202, the data composition means 202 is capable of reorganizing data by using only either of the packets, such as a packet that has arrived first.

FIG. 15 illustrates a case in which packet 2 in a TCP connection 3012 is lost. Even when packet 2 is lost and packets 2 to 6, which have been expected to arrive from the receiving means 2012, are judged to be lost packets in the data composition means 202, no deterioration is caused in sound quality because identical packets have arrived from the receiving means 2011 to the data composition means 202.

Although, in the examples illustrated in FIGS. 14 and 15, a method in which identical data are transmitted at the same time using two TCP connections is employed, other methods may be employed, such as transmitting the data with a time difference, transmitting identical data not to all TCP connections but to only another TCP connection or a plurality of other TCP connections in a limited way, and transmitting not a copy but redundant data, which are obtained through matrix operations, of the data.

Figure 16:
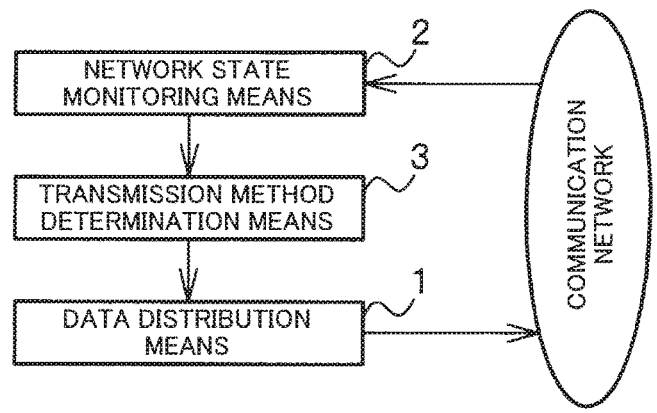
FIG. 16 is a block diagram illustrating a summary of the transmission device according to the present invention.

Next, a summary of the present invention will be described. FIG. 16 is a block diagram illustrating a summary of a transmission device according to the present invention. The transmission device according to the present invention includes a data distribution means 1 that distributes segmented data to one or a plurality of TCP connections (for example, the data distribution means 104), a network state monitoring means 2 that monitors the state of a communication network (for example, the transmission-side network state monitoring means 107), and a transmission method determination means 3 that changes a method of segmenting data and a method of transmission of the segmented data in accordance with the state of the communication network, which is a result of monitoring by the network state monitoring means 2 (for example, the transmission method determination means 108).

With such a configuration, the transmission device is capable of achieving voice communication with low latency and preventing deterioration in voice data.

The transmission method determination means 3 may be configured to change a unit for segmenting data on the basis of the state of the communication network.

With such a configuration, the transmission device is capable of reducing the number of lost packets and reducing time to retransmission of packets.

The data distribution means 1 and the transmission method determination means 3 may be configured to distribute segmented data to a plurality of TCP connections and to change the number of TCP connections on the basis of the state of the communication network, respectively.

With such a configuration, the transmission device is capable of preventing a delay from being caused to the whole voice data.

The data distribution means 1 may be configured to distribute identical segmented data to a plurality of TCP connections.

With such a configuration, the transmission device is capable of reducing the amount of data that are treated as lost packets due to retransmission delays.

The data distribution means 1 may be configured to distribute redundant data, which are calculated from a plurality of packets, to the TCP connections.

With such a configuration, the transmission device is capable of distributing redundant data, which are obtained through matrix operations, to a plurality of TCP connections.

Figure 17:
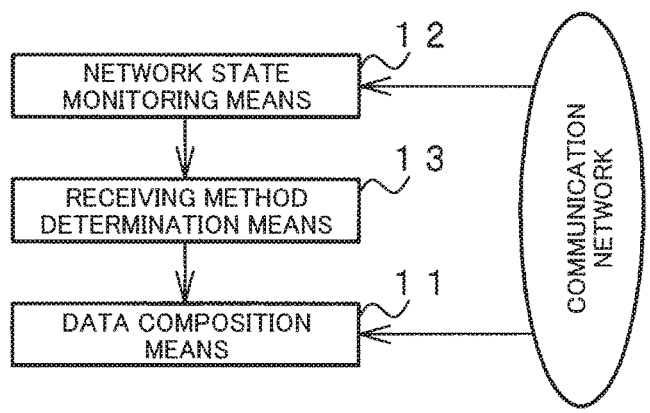
FIG. 17 is a block diagram illustrating a summary of the receiving device according to the present invention.

FIG. 17 is a block diagram illustrating a summary of a receiving device according to the present invention. The receiving device according to the present invention includes a data composition means 11 that composites received segmented data (for example, the data composition means 202), a network state monitoring means 12 that monitors the state of the communication network (for example, the receiving-side network state monitoring means 205), and a receiving method determination means 13 that changes a method of receiving the segmented data and a method of compositing the segmented data in accordance with the state of the communication network, which is a result of monitoring by the network state monitoring means 12 (for example, the receiving method determination means 206).

With such a configuration, the receiving device is capable of achieving voice communication with low latency and preventing deterioration in voice data.

The data composition means 11 and the receiving method determination means 13 may be configured to treat, as lost data, segmented data that the data composition means 11 have not been able to receive within a predetermined delay time and to change the predetermined delay time on the basis of the state of the communication network, respectively.

With such a configuration, the receiving device is capable of controlling the allowable delay time so as not to cause packet losses to the extent possible.

The receiving method determination means 13 may be configured to change the number of TCP connections on the basis of the state of the communication network.

The data composition means 11 may be configured to carry out data interpolation for segmented data that are treated as lost data.

With such configurations, the receiving device is capable of making lost packets unnoticeable and preventing deterioration in sound quality.

The data composition means 11 may be configured to, in the case of receiving a plurality of identical pieces of segmented data, discard pieces of received segmented data other than a particular piece of received segmented data.

The data composition means 11 may composite data by generating segmented data that have been treated as lost data from received redundant data.

Figure 18:
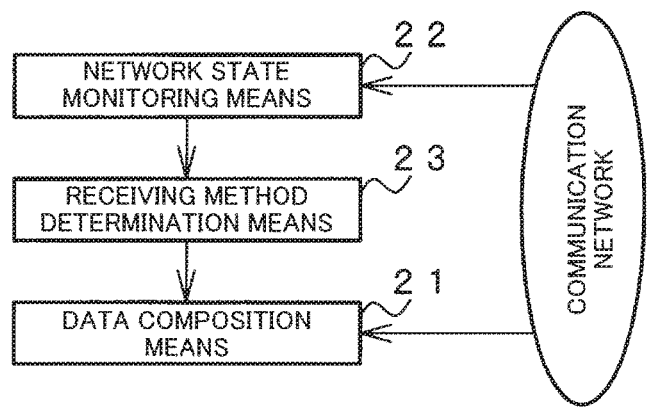
FIG. 18 is a block diagram illustrating a summary of a relay device according to the present invention.

FIG. 18 is a block diagram illustrating a summary of a relay device according to the present invention. The relay device according to the present invention includes a data composition means 21 that composites received segmented data (for example, the data composition means 202), a network state monitoring means 22 that monitors the state of the communication network (for example, the receiving-side network state monitoring means 205), and a receiving method determination means 23 that changes a method of receiving the segmented data and a method of compositing the segmented data in accordance with the state of the communication network, which is a result of monitoring by the network state monitoring means 22 (for example, the receiving method determination means 206).

The relay device, for example, includes a receiving means that uses UDP.

The relay device, for example, includes a transmission means that uses UDP.

The present invention was described above through exemplary embodiments and examples thereof, but the present invention is not limited to the above exemplary embodiments and examples, and various modifications that could be understood by a person skilled in the art may be applied to the configurations and details of the present invention within the scope of the present invention.

This application claims priority based on Japanese Patent Application No. 2013-134095, filed on Jun. 26, 2013, the entire disclosure of which is incorporated herein by reference.

INDUSTRIAL APPLICABILITY

The present invention is applicable to a communication device that communicates multimedia data, such as a voice and a video, from a transmission device to a receiving device with low latency and high quality.

REFERENCE SIGNS LIST

1 Data distribution means
2 Network state monitoring means
3 Transmission method determination means
11, 21 Data composition means
12, 22 Network state monitoring means
13, 23 Receiving method determination means
10 Media communication system
100 Transmission device
108 Transmission method determination means
107 Transmission-side network state monitoring means
200 Receiving device
206 Receiving method determination means
205 Receiving-side network state monitoring means
101 Media input means
102 Encoding means
103 Data segmenting means
104 Data distribution means
1051, 1052, 105$m$, 105$n$ Transmission means
106 Transmission-side connection management means
2011, 2012, 201$m$, 201$n$ Receiving means
202 Data composition means
203 Reproduction means
204 Receiving-side connection management means
300 IP network
3011, 3012, 301$m$, 301$n$ TCP connection
302 Network emulator
400, 401 Multimedia data storage unit
500 Multimedia data
600, 601 Relay device

What is claimed is:

1. A transmission device that is connected to a receiving device through at least two plurality of TCP (Transmission Control Protocol) connections, and segments transmission target data into a plurality of segmented packets, and distributes the segmented packets to the plurality of TCP connections for transmitting to the receiving device in which such a packet not arriving within an allowable delay time is treated as a lost packet, comprising:

a processor;
a memory storing code executable by the processor to:
distribute the segmented to the plurality of TCP connections by giving time stamp information to each of the segmented packets;

monitor and estimate a state of a communication network including a packet loss rate, packet arrival delays or a currently-available frequency bandwidth; and based on the estimated state of the communication network, change a segmentation interval of each packet, such that lengthening the segmentation interval within the range of allowable transmission delay or shortening the segmentation interval to increase the number of packets, and changes a number of TCP connections to which the segmented packets are to be distributed, such that the number of TCP connections is increased as a number of packet losses increases.

2. The transmission device according to claim 1, wherein each segmented packet is distributed by using a TCP connection with a small transmission delay among the plurality of TCP connections.

3. The transmission device according to claim 1, wherein identical segmented packets are distributed to all the plurality of TCP connections in parallel.

4. The transmission device according to claim 1, wherein redundant data, which are calculated from a plurality of packets, are distributed to TCP connections.

5. A receiving device that is connected to a transmission device through at least two plurality of TCP (Transmission Control Protocol) connections and receives segmented packets, which are created by segmenting transmission target data and transmitted from the transmission device by distributed through the plurality of TCP connections, comprising:

a processor;
a memory storing code executable by the processor to:
composite the received segmented packets by treating such a packet not arriving within an allowable delay time as a lost packet;
monitor and estimate a state of a communication network including a packet loss rate, packet arrival delays or a currently-available frequency bandwidth; and
that based on the estimated state of the communication network, change a time interval of the allowable delay time that has been counted detecting the lost packet such that the allowable delay time is set short or lengthened, and change a number of TCP connections from which the distributed segmented packets are received, such that the number of TCP connections is increased as a number of packet losses increases.

6. The receiving device according to claim 5, wherein data interpolation is carried out for a segmented packet that is treated as the lost packet.

7. The receiving relay device according to claim 5, wherein the composited data is transmitted to another receiving device.

8. A communication system comprising:
a transmission device that segments transmission target data into a plurality of segmented packets, and distributes the segments packets to at least two plurality of TCP (Transmission Control Protocol) connections for transmitting, including:
a data distribution unit that is implemented at least by first hardware and that distributes the segmented packets to the plurality of TCP connections by giving time stamp information to each of the segmented packets;
a network state monitoring unit that is implemented at least by the first hardware and that monitors and estimates a state of a communication network of a transmission side including a packet loss rate, packet arrival delays or a currently available frequency bandwidth;
a transmission method determination unit that is implemented at least by the first hardware and that, based on the estimated state of the communication network of a packet, such that lengthening the segmentation interval within the rage of allowable transmission delay or shortening the segmentation interval to increase the number of packets, and changes a number of TCP connections to which segmented packets are to be distributed, such that the number of TCP connections is increased as a number of packet losses increases, and
a receiving device that is connected to the transmission device through the plurality of TCP connections and received segmented packets, including:
a data composition unit that is implemented at least by second hardware and that composites the received segmented packets by treating such a packet not arriving within allowable delay time as a lost packet;
a network state monitoring unit that is implemented at least by second hardware and that monitors and estimates a state of a communication network of a receiving side including a packet loss rate, packet arrival delays or a currently-available frequency bandwidth; and
a receiving method determination unit that is implemented at least by second hardware and that, based on the estimated state of the communication network of a receiving side, changes a time interval of the allowable delay time counted in the data composition unit for detecting the lost packet such that the allowable delay time is set short or lengthened, and changes a number of TCP connections from which the distributed segmented packets are received, such that the number of TCP connections is increased as a number of packet losses and increases.

9. A communication method for a communication system including a transmission device that segments transmission target data into a plurality of segmented packets and distributes the segmented packets to at least two plurality of TCP (Transmission Control Protocol) connections for transmitting, and a receiving device that is connected to the transmission device through the plurality of TCP connections and received segmented packets, the method comprising:
distributing the segmented packets to the plurality of TCP connections by giving time stamp information to each of the segmented packets;
monitoring and estimating, in the transmission device, a state of a communication network of a transmission side including a packet loss rate, packet arrival delays or a currently-available frequency bandwidth;
changing, in the transmission device based on the estimated state of the communication network of a transmission side, a segmentation interval of each packet, such that lengthening the segmentation interval within the range of allowable transmission delay or shortening the segmentation interval to increase the number of packets, and changing a number of TCP connections to which segmented packets are to be distributed, such that the number of TCP connections is increased as a number of packet losses increases;
compositing, in the receiving device, the received segmented packets by treating such a packet not arriving within and allowable delay time as a lost packet;

monitoring and estimating, in the receiving device, a state of a communication network of a receiving side including a packet loss rate, packet arrival delays or a currently-available frequency bandwidth; and changing, in the receiving device based on the estimated state of the communication network of a receiving side, a time interval of the allowable delay time counted for detecting the lost packet such that the allowable delay time counted for detecting the lost packet such that the allowable delay time is set short or lengthened, and changes a number of TCP connections from which the distributed segmented packets are received, such that the number of TCP connections is increased as a number of packet losses increases.

* * * * *